United States Patent
Suzuki et al.

(10) Patent No.: US 9,878,700 B2
(45) Date of Patent: **\*Jan. 30, 2018**

(54) INDICATOR APPARATUS FOR HYBRID VEHICLE, HYBRID VEHICLE, INDICATING METHOD FOR HYBRID VEHICLE

(71) Applicant: TOYOTA JIDOSHA KABUSHIKI KAISHA, Toyota-shi, Aichi-ken (JP)

(72) Inventors: Naoto Suzuki, Fujinomiya (JP); Motohiro Nakashima, Aichi-gun (JP)

(73) Assignee: TOYOTA JIDOSHA KABUSHIKI KAISHA, Toyota (JP)

(\*) Notice: Subject to any disclaimer, the term of this patent is extended or adjusted under 35 U.S.C. 154(b) by 0 days.

This patent is subject to a terminal disclaimer.

(21) Appl. No.: 15/205,358

(22) Filed: Jul. 8, 2016

(65) Prior Publication Data

US 2016/0318502 A1   Nov. 3, 2016

Related U.S. Application Data

(60) Continuation of application No. 14/166,520, filed on Jan. 28, 2014, now Pat. No. 9,415,685, which is a
(Continued)

(30) Foreign Application Priority Data

Sep. 25, 2006  (JP) ................. 2006-258322

(51) Int. Cl.
*H01M 10/46* (2006.01)
*B60W 20/10* (2016.01)
(Continued)

(52) U.S. Cl.
CPC ............. *B60W 20/10* (2013.01); *B60K 6/365* (2013.01); *B60K 6/442* (2013.01); *B60K 6/445* (2013.01);
(Continued)

(58) Field of Classification Search
None
See application file for complete search history.

(56) References Cited

U.S. PATENT DOCUMENTS 3,452,621 A   7/1969 Golan et al.
3,503,464 A   3/1970 Yardney
(Continued)

FOREIGN PATENT DOCUMENTS

DE           195 33 829 C1    9/1996
DE    10 2006 008 064 A1    8/2006
(Continued)

OTHER PUBLICATIONS

Norbye, Jan P. and Jim Dunne. " . . . And a Commuter Car with Hybrid Drive." Popular Science Jul. 1969: 86-87.
(Continued)

*Primary Examiner* — Brent Swarthout
(74) *Attorney, Agent, or Firm* — Oliff PLC

(57) ABSTRACT

An indicator apparatus for a hybrid vehicle includes a display region having a range that extends between first and second ends of the display region. The display region displays a first mark to indicate to the driver a first state amount that changes in accordance with the output demand from the driver, a first edge of the first mark moving across the range between the first and second ends of the display region as the first state amount changes. A second mark having a second edge is displayed so that the second edge extends across and overlaps the display region, the second edge indicating to the driver a threshold at which switching occurs between an EV traveling mode and an HV traveling mode.

13 Claims, 18 Drawing Sheets

Related U.S. Application Data division of application No. 12/310,332, filed as application No. PCT/JP2007/067089 on Aug. 27, 2007, now Pat. No. 8,669,855.

(51) Int. Cl.

| | | |
|---|---|---|
| *B60K 6/365* | (2007.10) | |
| *B60K 6/445* | (2007.10) | |
| *B60K 35/00* | (2006.01) | |
| *B60L 11/14* | (2006.01) | |
| *B60W 10/06* | (2006.01) | |
| *B60W 10/08* | (2006.01) | |
| *B60W 20/00* | (2016.01) | |
| *B60W 20/20* | (2016.01) | |
| *B60W 20/40* | (2016.01) | |
| *B60K 6/442* | (2007.10) | |
| *B60W 30/182* | (2012.01) | |
| *B60K 1/02* | (2006.01) | |
| *B60W 50/14* | (2012.01) | |

(52) U.S. Cl.
CPC .............. *B60K 35/00* (2013.01); *B60L 11/14* (2013.01); *B60W 10/06* (2013.01); *B60W 10/08* (2013.01); *B60W 20/00* (2013.01); *B60W 20/20* (2013.01); *B60W 20/40* (2013.01); *B60W 30/182* (2013.01); *B60W 50/14* (2013.01); *B60K 1/02* (2013.01); *B60L 2240/421* (2013.01); *B60L 2240/423* (2013.01); *B60L 2240/441* (2013.01); *B60L 2240/486* (2013.01); *B60L 2250/16* (2013.01); *B60W 2050/146* (2013.01); *B60W 2510/0638* (2013.01); *B60W 2510/081* (2013.01); *B60W 2510/1005* (2013.01); *B60W 2510/244* (2013.01); *B60W 2540/10* (2013.01); *B60W 2710/083* (2013.01); *B60W 2710/105* (2013.01); *B60Y 2200/90* (2013.01); *Y02T 10/6239* (2013.01); *Y02T 10/6286* (2013.01); *Y02T 10/642* (2013.01); *Y02T 10/70* (2013.01); *Y02T 10/7077* (2013.01); *Y10S 903/903* (2013.01)

(56) References Cited

U.S. PATENT DOCUMENTS

| | | | |
|---|---|---|---|
| 3,604,963 | A | 9/1971 | Tawara |
| 5,309,139 | A | 5/1994 | Austin |
| 5,697,466 | A | 12/1997 | Moroto et al. |
| 5,757,595 | A | 5/1998 | Ozawa et al. |
| 5,808,445 | A | 9/1998 | Aylor et al. |
| 5,929,595 | A | 7/1999 | Lyons et al. |
| 6,158,541 | A | 12/2000 | Tabata et al. |
| 6,380,640 | B1 | 4/2002 | Kanamori et al. |
| 6,457,351 | B1 | 10/2002 | Yamamoto |
| 6,480,106 | B1 | 11/2002 | Crombez et al. |
| 6,501,250 | B2 | 12/2002 | Bito et al. |
| 6,774,771 | B2 | 8/2004 | Takeda |
| 7,091,839 | B2 | 8/2006 | Situ et al. |
| 7,357,204 | B2 | 4/2008 | Hisada et al. |
| 7,617,894 | B2 | 11/2009 | Ozeki et al. |
| 7,898,405 | B2 | 3/2011 | Burke et al. |
| 8,217,620 | B2 | 7/2012 | Hanssen et al. |
| 8,669,855 | B2 * | 3/2014 | Suzuki et al. ............... 340/439 |
| 9,415,685 | B2 * | 8/2016 | Suzuki et al. ............... 340/439 |
| 2002/0171541 | A1 | 11/2002 | Crombez et al. |
| 2005/0068007 | A1 | 3/2005 | Prema et al. |
| 2005/0263333 | A1 | 12/2005 | Fujiki |
| 2006/0185917 | A1 | 8/2006 | Ozeki et al. |
| 2007/0029121 | A1 | 2/2007 | Saitou et al. |
| 2008/0042821 | A1 | 2/2008 | Kaya |
| 2010/0030413 | A1 | 2/2010 | Jinno |
| 2010/0049389 | A1 | 2/2010 | Ando |

FOREIGN PATENT DOCUMENTS

| | | |
|---|---|---|
| EP | 1 707 430 A1 | 10/2006 |
| JP | H07315078 A | 12/1995 |
| JP | H0879907 A | 3/1996 |
| JP | H09168202 A | 6/1997 |
| JP | H11220808 A | 8/1999 |
| JP | 2000234538 A | 8/2000 |
| JP | 2001112112 A | 4/2001 |
| JP | 2002247706 A | 8/2002 |
| JP | 2003023703 A | 1/2003 |
| JP | 2005035413 A | 2/2005 |
| JP | 2005255158 A | 9/2005 |
| JP | 2006220482 A | 8/2006 |
| JP | 2006233760 A | 9/2006 |
| JP | 2006290182 A | 10/2006 |
| JP | 2006321364 A | 11/2006 |
| JP | 2007125921 A | 5/2007 |
| JP | 2007186045 A | 7/2007 |
| JP | 2007237970 A | 9/2007 |
| JP | 2007314100 A | 12/2007 |
| RU | 2 223 183 C2 | 2/2004 |
| WO | 2006/001809 A1 | 1/2006 |

OTHER PUBLICATIONS

May 22, 2015 Office Action issued in U.S. Appl. No. 14/166,520.
Jan. 5, 2016 Office Action issued in U.S. Appl. No. 14/166,520.
Apr. 12, 2016 Notice of Allowance issued in U.S. Appl. No. 14/166,520.
Oct. 26, 2009 Search Report issued in European Patent Application No. 07806562.0.
May 3, 2011 Office Action issued in Russian Patent Application No. 2009121523.
Aug. 25, 2011 Office Action issued in U.S. Appl. No. 12/445,409.
Jan. 4, 2012 Office Action issued in Chinese Patent Application No. 200780041377.X.
Feb. 27, 2012 Office Action issued in U.S. Appl. No. 12/445,409.
Sep. 11, 2012 Notice of Allowance issued in U.S. Appl. No. 12/445,409.
Aug. 31, 2012 Notice of Allowance issued in U.S. Appl. No. 13/369,597.
Mar. 22, 2005 "Harrier Hybrid New Car Model Guide", Toyota Jidosha Kabushiki Kaisha pp. 11-176-11-178 and 11-183.
Hybrid Interfaces—accessed Oct. 13, 2011.
TwEEcer—accessed Oct. 13, 2011.
Knowling, Michael, New Car Test—New Generation Prius, Jan. 31, 2004, AutoWeb, accessed Mar. 7, 2012, http://www.autoweb.com.au/A_2012/cms/article.html.
May 5, 2011 Office Action issued in U.S. Appl. No. 12/310,332.
Oct. 28, 2011 Office Action issued in U.S. Appl. No. 12/310,332.
Mar. 16, 2012 Office Action issued in U.S. Appl. No. 12/310,332.
Oct. 18, 2012 Office Action issued in U.S. Appl. No. 12/310,332.
May 23, 2013 Office Action issued in U.S. Appl. No. 12/310,332.
Oct. 18, 2013 Notice of Allowance issued in U.S. Appl. No. 12/310,332.
May 25, 2015 Office Action issued in U.S. Appl. No. 14/166,520.

* cited by examiner

FIG.16

| TARGET OF OUTPUT RESTRICTION | CONDITION |
|---|---|
| POWER STORAGE APPARATUS | SOC IS NOT GREATER THAN PRESCRIBED VALUE |
| | POWER STORAGE APPARATUS TEMPERATURE IS NOT HIGHER THAN LOWER LIMIT VALUE |
| | POWER STORAGE APPARATUS TEMPERATURE IS NOT LOWER THAN UPPER LIMIT VALUE |
| PCU | INVERTER TEMPERATURE IS NOT LOWER THAN UPPER LIMIT VALUE DURING LOADED TRAVELING |
| | BOOST CONVERTER TEMPERATURE IS NOT LOWER THAN UPPER LIMIT VALUE DURING LOADED TRAVELING |
| MOTOR-GENERATOR | MOTOR-GENERATOR TEMPERATURE IS NOT LOWER THAN UPPER LIMIT VALUE DURING LOADED TRAVELING |

INDICATOR APPARATUS FOR HYBRID VEHICLE, HYBRID VEHICLE, INDICATING METHOD FOR HYBRID VEHICLE

CROSS-REFERENCE TO RELATED APPLICATION

This is a Continuation of U.S. patent application Ser. No. 14/166,520, filed Jan. 28, 2014 (now U.S. Pat. No. 9,415,685), which in turn is a Divisional of U.S. patent application Ser. No. 12/310,332 (now U.S. Pat. No. 8,669,855), which is the U.S. National Phase of International Application No. PCT/JP2007/067089, filed Aug. 27, 2007, which claims priority to Japanese Patent Application No. 2006-258322 (filed Sep. 25, 2006). The contents of each of the aforementioned applications are incorporated herein by reference in their entireties.

TECHNICAL FIELD

The present invention relates to an indication technique for a hybrid vehicle incorporating an internal combustion engine and an electric motor as motive power sources.

BACKGROUND ART

In recent years, hybrid vehicles are receiving widespread attention as environmentally friendly vehicles. As motive power sources, the hybrid vehicles incorporate, in addition to a conventional engine, a power storage apparatus, an inverter, and a motor driven by the inverter.

Among such hybrid vehicles, the vehicles capable of traveling while switching between a traveling mode where traveling is performed only by the motor without starting the engine (hereinafter also referred to as "EV mode") and a traveling mode where traveling is performed by both the engine and the motor (hereinafter also referred to as "HV mode") are known.

For example, Japanese Patent Laying-Open No. 2001-112112 discloses a hybrid vehicle that switches between such traveling modes in accordance with an operation point of a driveshaft. The hybrid vehicle travels in EV mode when started. Thereafter, when the operation point of the driveshaft crosses the border between an underdrive range and an overdrive range, and enters the overdrive range, underdrive coupling is switched to overdrive coupling. The engine is started, and traveling is performed in HV mode.

However, with the hybrid vehicle disclosed by Japanese Patent Laying-Open No. 2001-112112, the driver cannot recognize in advance the timing for switching from EV mode to HV mode, and therefore, the driver may feel discomfort about the abrupt starting of the engine.

In particular, it is expected that the driver is likely to feel such discomfort with a hybrid vehicle in which a power storage apparatus is chargeable from a power supply external to the vehicle (such as from a system power supply). That is, the hybrid vehicle having an externally charging function is equipped with a power storage apparatus that is greater in power storage capacity than that of a conventional hybrid vehicle (without the externally charging function), so as to make full use of charging from the external power supply. Then, the kilometer per charge of EV mode having conventionally been, for example, some kilometers, will be increased to be not smaller than 10 kilometers. Thus, traveling would be performed mostly in EV mode. Accordingly, the driver is likely to feel discomfort when EV mode is switched to HV mode.

Additionally, if a traveling mode switching point can be indicated to the driver who wishes to continue traveling in EV mode, the driver can intentionally avoid switching from EV mode to HV mode. Accordingly, environmentally friendly driving can be achieved.

DISCLOSURE OF THE INVENTION

Accordingly, the present invention has been made to solve the above-described problem, and an object thereof is to provide an indicator apparatus for indicating a traveling mode switching point to a driver, and a hybrid vehicle.

Another object of the present invention is to provide an indicating method for a hybrid vehicle in which a traveling mode switching point is indicated to a driver.

According to the present invention, a hybrid vehicle incorporates an internal combustion engine and an electric motor as motive power sources, and is capable of traveling in one of traveling modes including a first mode (EV mode) where traveling is performed while the internal combustion engine is stopped and a second mode (HV mode) where traveling is performed while both of the internal combustion engine and the electric motor are operated. An indicator apparatus for the hybrid vehicle includes a control portion, a first indicator portion and a second indicator portion. The control portion switches between the traveling modes based on an output demand from a driver. The first indicator portion indicates a first state amount that changes in accordance with the output demand from the driver. The second indicator portion indicates a second state amount that shows switching of the traveling modes as corresponded to the first state amount.

Preferably, the first and second state amounts are accelerator pedal opening degrees.

Preferably, the first indicator portion indicates the first state amount by a change of an indication region or an indication position. The second indicator portion includes a traveling mode indication region provided corresponding to the first indicator portion, and a division line dividing, in accordance with the second state amount, the traveling mode indication region into a first region showing that the traveling mode is the first mode and a second region showing that the traveling mode is the second mode.

Preferably, the control portion changes a threshold value for switching the traveling modes in accordance with a speed of the vehicle. The second indicator portion changes the second state amount in accordance with the change of the threshold value for switching.

Preferably, when an output power of a power storage apparatus supplying electric power to the electric motor is restricted, the control portion changes a threshold value for switching the traveling modes so that a range in which traveling is performed in the second mode is increased. The second indicator portion changes the second state amount in accordance with the change of the threshold value for switching.

Preferably, when a temperature of a power converting apparatus converting electric power between a power storage apparatus supplying electric power to the electric motor and the electric motor becomes not lower than a prescribed temperature, the control portion changes a threshold value for switching the traveling modes so that a range in which traveling is performed in the second mode is increased. The second indicator portion changes the second state amount in accordance with the change of the threshold value for switching.

Preferably, when a temperature of the electric motor becomes not lower than a prescribed temperature, the control portion changes a threshold value for switching the traveling modes so that a range in which traveling is performed in the second mode is increased. The second indicator portion changes the second state amount in accordance with the change of the threshold value for switching.

Preferably, when starting of the internal combustion engine is demanded based on a prescribed condition irrespective of the output demand from the driver, the control portion forcibly switches the traveling mode to the second mode. When the traveling mode is forcibly switched to the second mode, the second indicator portion changes the second state amount so as to show that the second mode is selected for an entire range of the first state amount.

Preferably, the hybrid vehicle includes a switch for allowing the driver to select traveling in the first mode. When the switch is operated by the driver, the control portion changes a threshold value for switching the traveling modes so that a range in which traveling is performed in the first mode is increased. The second indicator portion changes the second state amount in accordance with the change of the threshold value for switching.

Preferably, an indication update cycle of the second indicator portion is longer than an indication update cycle of the first indicator portion.

According to the present invention, a hybrid vehicle includes: an internal combustion engine and an electric motor incorporated as motive power sources; a chargeable power storage apparatus supplying electric power to the electric motor; a charging apparatus configured to receive electric power supplied from an outside of the vehicle and to be capable of charging the power storage apparatus; a control portion; a first indicator portion; and a second indicator portion. The control portion switches, based on an output demand from a driver, between traveling modes including a first mode (EV mode) where traveling is performed while the internal combustion engine is stopped and a second mode (HV mode) where traveling is performed while both of the internal combustion engine and the electric motor are operated. The first indicator portion indicates a first state amount that changes in accordance with the output demand from the driver. The second indicator portion indicates a second state amount that shows switching of the traveling modes as corresponded to the first state amount.

Preferably, the charging apparatus includes: a further electric motor; first and second inverters provided corresponding to the further electric motor and the electric motor, respectively; an inverter control portion controlling the first and second inverters; and a power input portion for receiving an input of power supplied from an outside of the vehicle. The further electric motor and the electric motor include first and second polyphase windings as stator windings, respectively. The power input portion is connected to a first neutral point of the first polyphase winding and a second neutral point of the second polyphase winding, and provides electric power supplied from the outside of the vehicle to the first and second neutral points. The inverter control portion controls the first and second inverters so that the first and second inverters convert alternating current power supplied from the outside of the vehicle via the power input portion to the first and second neutral points into direct current power, and output the converted power to the power storage apparatus.

According to the present invention, a hybrid vehicle incorporates an internal combustion engine and an electric motor as motive power sources, and is capable of traveling in one of traveling modes including a first mode (EV mode) where traveling is performed while the internal combustion engine is stopped and a second mode (HV mode) where traveling is performed while both of the internal combustion engine and the electric motor are operated. An indicating method for the hybrid vehicle includes the steps of: switching between the traveling modes based on an output demand from a driver; indicating a first state amount that changes in accordance with the output demand from the driver; and indicating a second state amount that shows switching of the traveling modes as corresponded to the first state amount.

In the present invention, the hybrid vehicle is capable of traveling in one of traveling modes including a first mode (EV mode) and a second mode (HV mode). Since a first state amount that changes in accordance with the output demand from the driver is indicated and a second state amount that shows switching of the traveling modes as corresponded to the first state amount is indicated, the driver can recognize a traveling mode switching point by comparing the indicated first and second state amount.

Therefore, according to the present invention, a traveling mode switching point can be indicated to the driver. As a result, the driver can be saved from feeling discomfort when the internal combustion engine is started. Additionally, the driver who wishes to continue traveling in the first mode is allowed to travel in the first mode while recognizing the switching point from the first mode to the second mode. That is, since the driver can intentionally avoid switching from the first mode to the second mode, the environmentally-friendly driving can be achieved.

BRIEF DESCRIPTION OF THE DRAWINGS

FIG. 16 is an illustration for describing output restriction control by an output restriction control portion shown in FIG. 15.

BEST MODES FOR CARRYING OUT THE INVENTION

Figure 1:
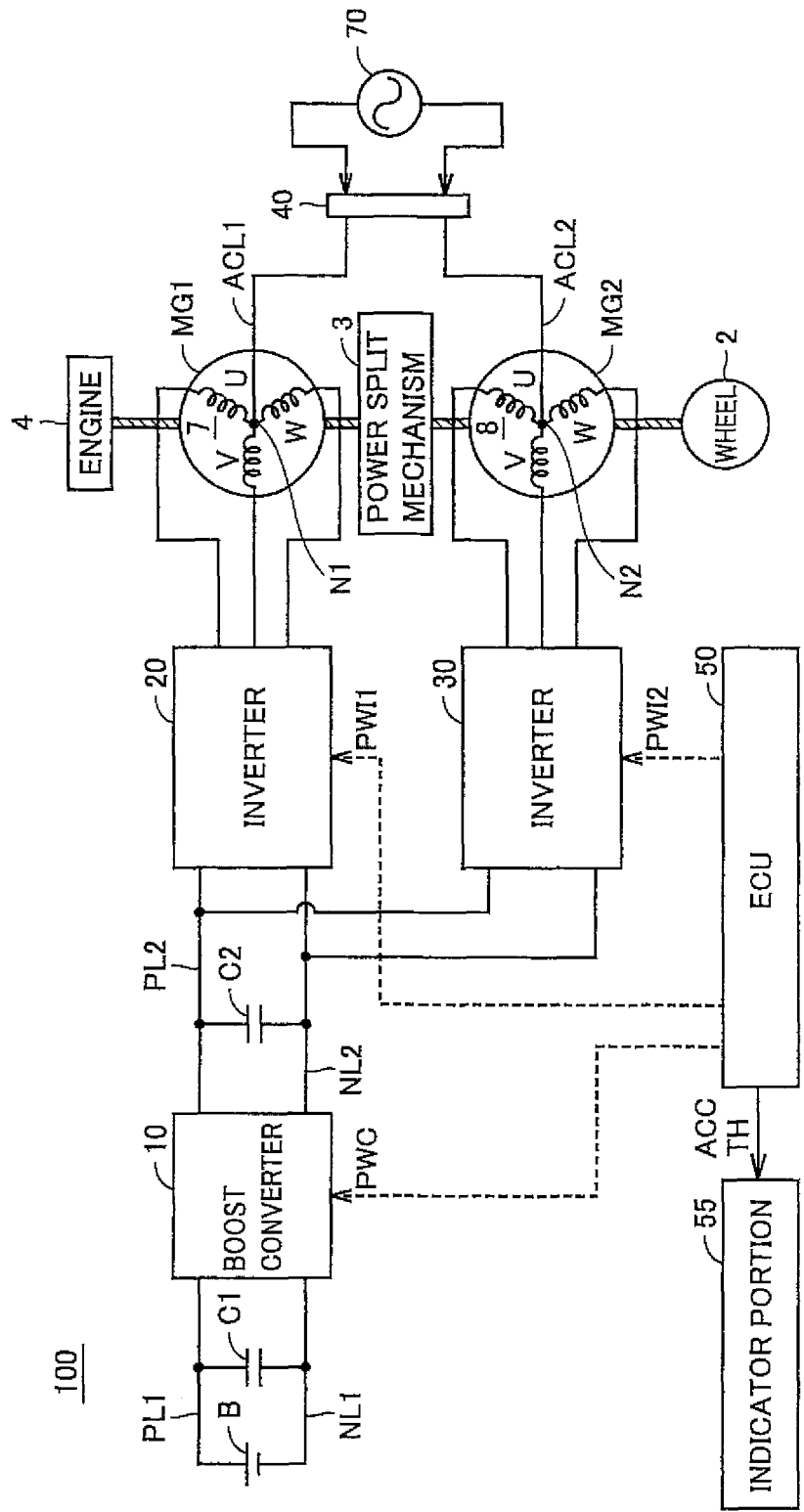
FIG. 1 is an overall block diagram showing a powertrain of a hybrid vehicle according to a first embodiment of the present invention.

In the following, embodiments of the present invention are described referring to the drawings. In the drawings, the same or corresponding parts are denoted by the same reference character, and description thereof is not repeated.

First Embodiment

FIG. 1 is an overall block diagram showing a powertrain of a hybrid vehicle according to a first embodiment of the present invention. Referring to FIG. 1, hybrid vehicle 100 includes an engine 4, motor-generators MG1, MG2, a power split mechanism 3, and wheels 2. Hybrid vehicle 100 further includes a power storage apparatus B, a boost converter 10, inverters 20, 30, a charge connector 40, an ECU (Electronic Control Unit) 50, an indicator portion 55, capacitors C1, C2, positive electrode lines PL1, PL2, and negative electrode lines NL1, NL2.

Power split mechanism 3 is linked to engine 4 and motor-generators MG1, MG2 for distributing motive power among them. For example, as power split mechanism 3, a planetary gear having three rotation shafts of a sun gear, a planetary carrier, and a ring gear can be used. These three rotation shafts are connected to the rotation shafts of engine 4 and motor-generators MG1, MG2, respectively. For example, by inserting the crankshaft of engine 4 through the center of a hollow rotor of motor-generator MG1, engine 4 and motor-generators MG1, MG2 can mechanically be connected to power split mechanism 3.

The motive power generated by engine 4 is distributed to wheels 2 and motor-generator MG1 by power split mechanism 3. That is, engine 4 is incorporated in hybrid vehicle 100 as a motive power source that drives wheels 2 and motor-generator MG1. Motor-generator MG1 is incorporated in hybrid vehicle 100 as an element that operates as a generator driven by engine 4 and that operates as an electric motor that can start engine 4. Motor-generator MG2 is incorporated in hybrid vehicle 100 as a motive power source that drives wheels 2.

The positive electrode of power storage apparatus B is connected to positive electrode line PL1, and the negative electrode of power storage apparatus B is connected to negative electrode line NL1. Capacitor C1 is connected between positive electrode line PL1 and negative electrode line NL1. Boost converter 10 is connected between positive and negative electrode lines PL1, NL1 and positive and negative electrode lines PL2, NL2. Capacitor C2 is connected between positive electrode line PL2 and negative electrode line NL2. Inverter 20 is connected between positive and negative electrode lines PL2, NL2 and motor-generator MG1. Inverter 30 is connected between positive and negative electrode lines PL2, NL2 and motor-generator MG2.

Motor-generator MG1 includes not-shown Y-connected three-phase coils 7 as stator coils, and is connected to inverter 20 via three-phase cables. Motor-generator MG2 similarly includes not-shown Y-connected three-phase coils 8 as stator coils, and is connected to inverter 30 via three-phase cables. A power input line ACL1 is connected to a neutral point N1 of three-phase coils 7, and a power input line ACL2 is connected to a neutral point N2 of three-phase coils 8.

Power storage apparatus B is a chargeable DC (Direct Current) power supply, configured with a secondary battery such as a nickel-hydride battery, a lithium-ion battery or the like, for example. Power storage apparatus B outputs DC power to boost converter 10. Power storage apparatus B receives electric power output from boost converter 10 and charged. It is to be noted that a capacitor of a large capacitance can be used as power storage apparatus B. Capacitor C1 smoothes the voltage variation across positive electrode line PL1 and negative electrode line NL1.

Based on a signal PWC from ECU 50, boost converter 10 boosts a DC voltage output from power storage apparatus B and outputs the same to positive electrode line PL2. Based on signal PWC, boost converter 10 steps down a DC voltage output from inverters 20, 30 to a voltage level of power storage apparatus B, and charges power storage apparatus B. Boost converter 10 is configured with a boost-buck chopper circuit, for example.

Capacitor C2 smoothes the voltage variation across positive electrode line PL2 and negative electrode line NL2. Inverters 20, 30 convert DC power supplied from positive electrode line PL2 and negative electrode line NL2 into AC (Alternating Current) power, and output the same to motor-generators MG1, MG2, respectively. Inverters 20, 30 convert AC power generated by motor-generators MG1, MG2 into DC power and output the same as regenerative power to positive electrode line PL2 and negative electrode line NL2, respectively.

Inverters 20, 30 are each formed by a bridge circuit including switching elements for three phases, for example. Inverters 20, 30 perform switching operation in accordance with signals PWI1, PWI2 from ECU 50, thereby driving the corresponding motor-generators, respectively.

When power storage apparatus B is charged from an external power supply 70 connected to charge connector 40, based on signals PWI1, PWI2 from ECU 50, inverters 20, 30 convert the electric power, which is supplied from external power supply 70 via power input lines ACL1, ACL2 to neutral points N1, N2, into DC power, and output the converted DC power to positive electrode line PL2.

Motor-generators MG1, MG2 are three-phase AC motors, and formed by three-phase AC synchronous motors, for example. Motor-generator MG1 generates three-phase AC power using motive force of engine 4, and outputs the generated three-phase AC power to inverter 20. Motor-generator MG1 generates drive force by three-phase AC power received from inverter 20, and starts engine 4. Motor-generator MG2 generates driving torque of the vehicle by three-phase AC power received from inverter 30. Motor-generator MG2 generates three-phase AC power in regenerative braking of the vehicle, and outputs the same to inverter 30.

ECU 50 generates signal PWC for driving boost converter 10 and signals PWI1, PWI2 for respectively driving motor-generators MG1, MG2, and outputs generated signals PWC, PWI1, PWI2 to boost converter 10 and inverters 20, 30, respectively.

Here, by a method that will be described later, ECU 50 controls switching, based on an accelerator pedal opening degree signal ACC indicative of an operated amount of the accelerator pedal and a vehicle state, between traveling performed by actuating engine 4 (HV mode) and traveling performed by using only motor-generator MG2 and stopping engine 4 (EV mode). ECU 50 calculates a threshold value TH of accelerator pedal opening degree that provides timing of actuating engine 4 (that is, timing of switching traveling mode), and outputs the calculated threshold value TH along with accelerator pedal opening degree signal ACC to indicator portion 55.

When power storage apparatus B is charged from external power supply 70, ECU 50 generates signals PWI1, PWI2 for controlling inverters 20, 30 so that they convert AC power supplied from external power supply 70 via power input lines ACL1, ACL2 to neutral points N1, N2 into DC power and output the same to positive electrode line PL2.

Indicator portion 55 receives, from ECU 50, accelerator pedal opening degree signal ACC and threshold value TH indicative of an accelerator pedal opening degree where traveling mode is switched. As will be described later, indicator portion 55 indicates an accelerator pedal opening degree by the driver's operation based on accelerator pedal opening degree signal ACC and also indicates, as being corresponded to that indication of the accelerator pedal opening degree, traveling mode (EV mode or HV mode) in accordance with the accelerator pedal opening degree based on threshold value TH.

Figure 2:
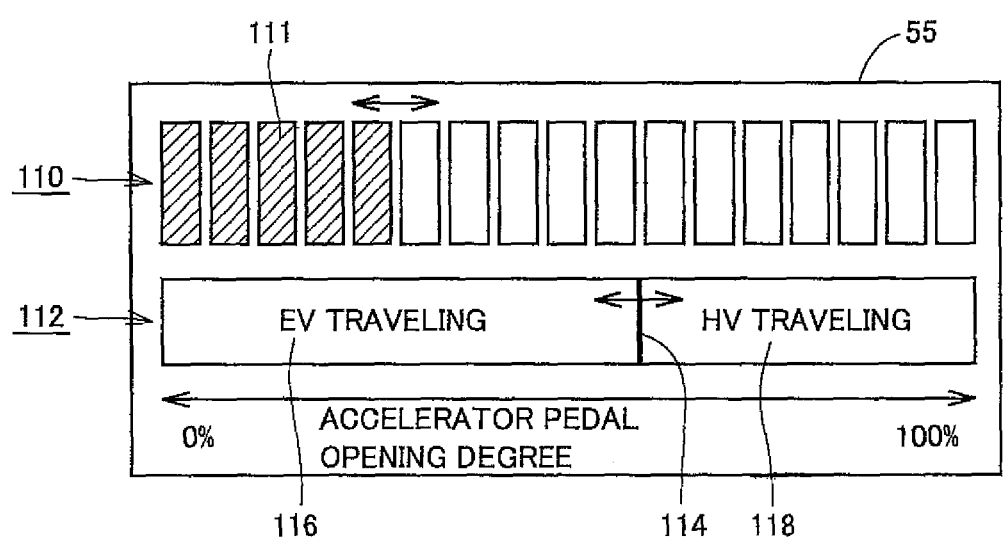
FIG. 2 shows an indicating state of an indicator portion shown in FIG. 1.

FIG. 2 shows an indicating state of indicator portion 55 shown in FIG. 1. Referring to FIG. 2, indicator portion 55 includes a first indicator portion 110 and a second indicator portion 112. First indicator portion 110 indicates an accelerator pedal opening degree by the driver's operation in a range of 0% (full close) to 100% (full open), based on accelerator pedal opening degree signal ACC from ECU 50. It is to be noted that the range of hatched region 111 shows an accelerator pedal opening degree.

Second indicator portion 112 is provided corresponding to first indicator portion 110, and includes a division line 114 and regions 116, 118 divided by division line 114. Division line 114 is indicated based on threshold value TH from ECU 50, and indicates an accelerator pedal opening degree where traveling mode is switched. That is, when the accelerator pedal opening degree by the driver's operation indicated on first indicator portion 110 is included in region 116, it is indicated that the vehicle travels in EV mode (EV traveling). When the accelerator pedal opening degree indicated on first indicator portion 110 is included in region 118, it is indicated that the vehicle travels in ITV mode (HV traveling).

Threshold value TH indicative of an accelerator pedal opening degree where traveling mode is switched changes in accordance with a vehicle speed as will be described later, and therefore the position of division line 114 changes in accordance with a vehicle speed.

Figure 3:
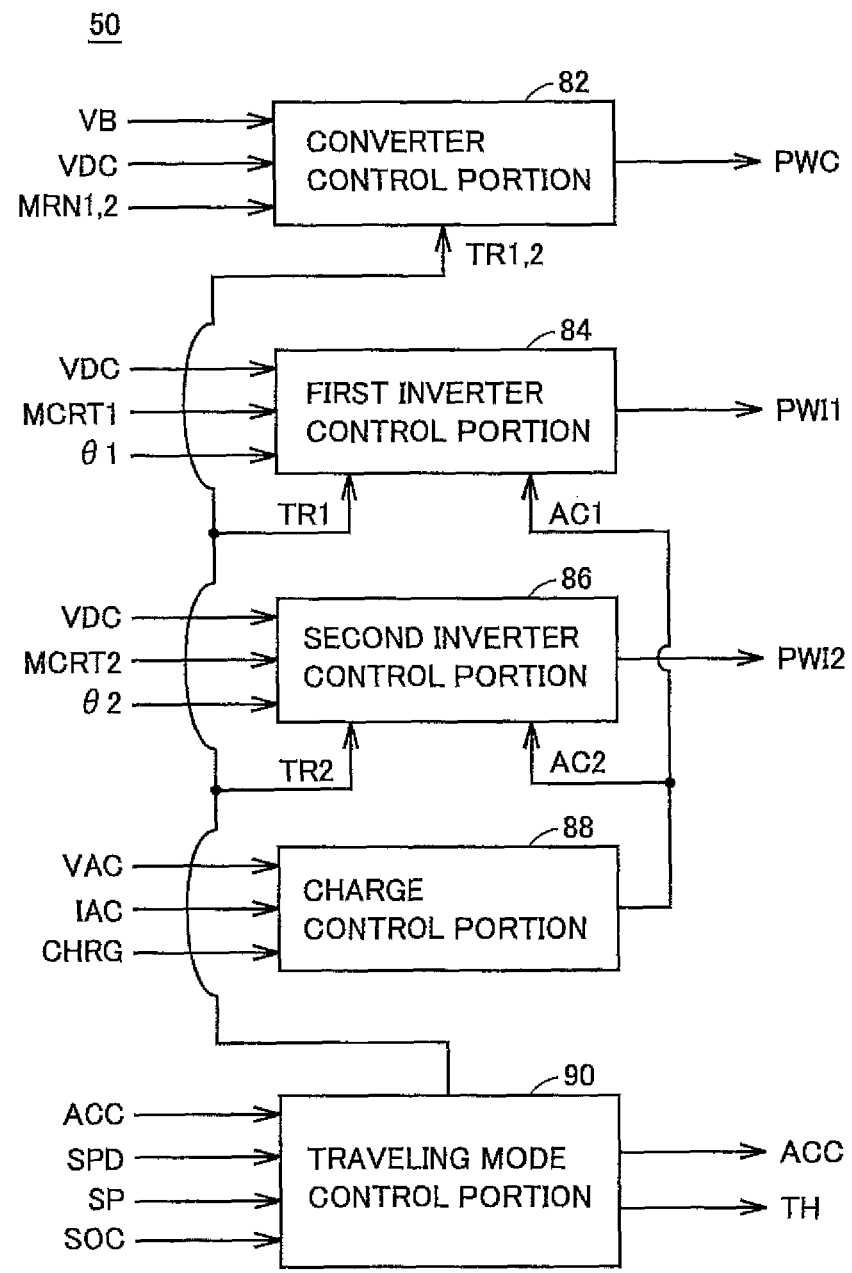
FIG. 3 is a functional block diagram of an ECU shown in FIG. 1.

FIG. 3 is a functional block diagram of ECU 50 shown in FIG. 1. Referring to FIG. 3, ECU 50 includes a converter control portion 82, first and second inverter control portions 84, 86, a charge control portion 88, and a traveling mode control portion 90.

Converter control portion 82 generates a signal PWC for driving boost converter 10, based on voltage VB of power storage apparatus B, voltage VDC across positive electrode line PL2 and negative electrode line NL2, rotation speeds MRN1, MRN2 of motor-generators MG1, MG2, and torque command values TR1, TR2 of motor-generators MG1, MG2 received from traveling mode control portion 90. Converter control portion 82 outputs the generated signal PWC to boost converter 10. Each of voltages VB, VDC and rotation speeds MRN1, MRN2 is detected by a not-shown sensor.

First inverter control portion 84 generates a signal PWI1 for driving motor-generator MG1, based on voltage VDC, motor current MCRT1 and rotor rotation position θ1 of motor-generator MG1, and torque command value TR1. First inverter control portion 84 outputs the generated signal PWI1 to inverter 20. Each of motor current MCRT1 and rotor rotation position θ1 is detected by a not-shown sensor.

Second inverter control portion 86 generates a signal PWI2 for driving motor-generator MG2, based on voltage VDC, motor current MCRT2 and rotor rotation position θ2 of motor-generator MG2, and torque command value TR2. Second inverter control portion 86 outputs the generated signal PWI2 to inverter 30. Each of motor current MCRT2 and rotor rotation position θ2 is detected by a not-shown sensor.

When power storage apparatus B is charged from external power supply 70, first and second inverter control portions 84, 86 respectively generate signals PWI1, PWI2 based on zero-phase voltage commands AC1, AC2 from charge control portion 88, and respectively output the generated signals PWI1, PWI2 to inverters 20, 30.

When a signal CHRG instructing charging of power storage apparatus B from external power supply 70 is activated, charge control portion 88 generates zero-phase voltage commands AC1, AC2 for allowing motor-generators MG1, MG2 and inverters 20, 30 to operate as a single-phase PWM converter as will be described later, based on voltage VAC and current IAC of AC power provided from external power supply 70 to neutral points N1, N2. Charge control portion 88 outputs the generated zero-phase voltage commands AC1, AC2 to first and second inverter control portions 84, 86, respectively. Voltage VAC and current IAC are detected by not-shown voltage sensor and current sensor, respectively.

Traveling mode control portion 90 receives accelerator pedal opening degree signal ACC indicative of an accelerator pedal opening degree, a vehicle speed signal SPD indicative of a vehicle speed, and a shift position signal SP indicative of a shift position. Traveling mode control portion 90 receives a state amount SOC indicative of state of charge (SOC) of power storage apparatus B. By the method that will be described later, traveling mode control portion 90 determines whether or not to actuate engine 4 when traveling, i.e., whether traveling is to be performed in EV mode or in HV mode. Based on a result of determination, traveling mode control portion 90 generates torque command values TR1, TR2 and outputs the same to converter control portion 82 and first and second inverter control portions 84, 86.

Traveling mode control portion 90 calculates threshold value TH of an accelerator pedal opening degree that provides timing of actuating engine 4 (that is, timing of switching traveling mode), and outputs the calculated threshold value TH along with accelerator pedal opening degree signal ACC to indicator portion 55 (FIG. 1).

Figure 4:
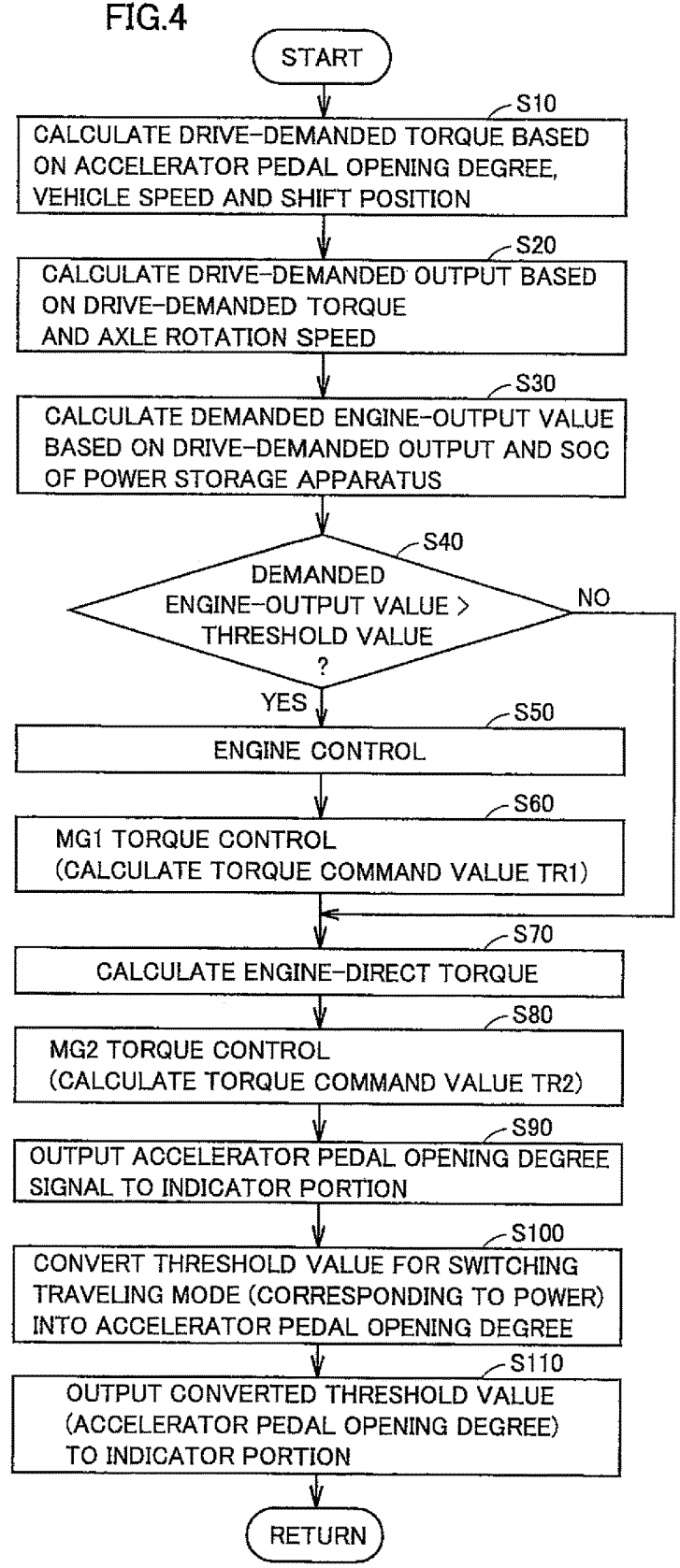
FIG. 4 is a flowchart for describing a control structure of a traveling mode control portion shown in FIG. 3.

Accelerator pedal opening degree signal ACC is detected by a not-shown accelerator pedal opening degree sensor detecting an operated amount of the accelerator pedal, while vehicle speed signal SPD and shift position signal SP are detected by not-shown vehicle speed sensor and shift position sensor, respectively. FIG. 4 is a flowchart for describing a control structure of traveling mode control portion 90 shown in FIG. 3. The processing of the flowchart is called from a main routine for a certain time period or every time a prescribed condition is satisfied when the vehicle is in a state capable of traveling (for example, when the vehicle system is active), and executed.

Referring to FIG. 4, traveling mode control portion 90 calculates a torque demanded for driving the vehicle (i.e., vehicular drive-demanded torque) (in axle) using a preset map or an operation expression, based on an accelerator pedal opening degree, a vehicle speed and a shift position respectively indicated by accelerator pedal opening degree signal ACC, vehicle speed signal SPD and shift position signal SP (step S10). Then, based on the calculated drive-demanded torque and the axle rotation speed, traveling mode control portion 90 calculates an output demanded for driving the vehicle (i.e., vehicular drive-demanded output) (step S20). Specifically, the drive-demanded output is calculated by multiplying the drive-demanded torque by the axle rotation speed.

Next, based on the calculated drive-demanded output and SOC of power storage apparatus B, traveling mode control portion 90 calculates a value of demanded engine output (i.e., demanded engine-output value) (step S30). Specifically, a demanded charge amount of power storage apparatus B is calculated based on SOC of power storage apparatus B. Adding the demanded charge amount to the drive-demanded output, the demanded engine-output value is calculated. Then, traveling mode control portion 90 determines whether or not the calculated demanded engine-output value is greater than a prescribed threshold value (step S40). This threshold value is a value for determining whether or not it is necessary to start engine 4. In other words, it is the threshold value for switching traveling mode.

Figure 5:
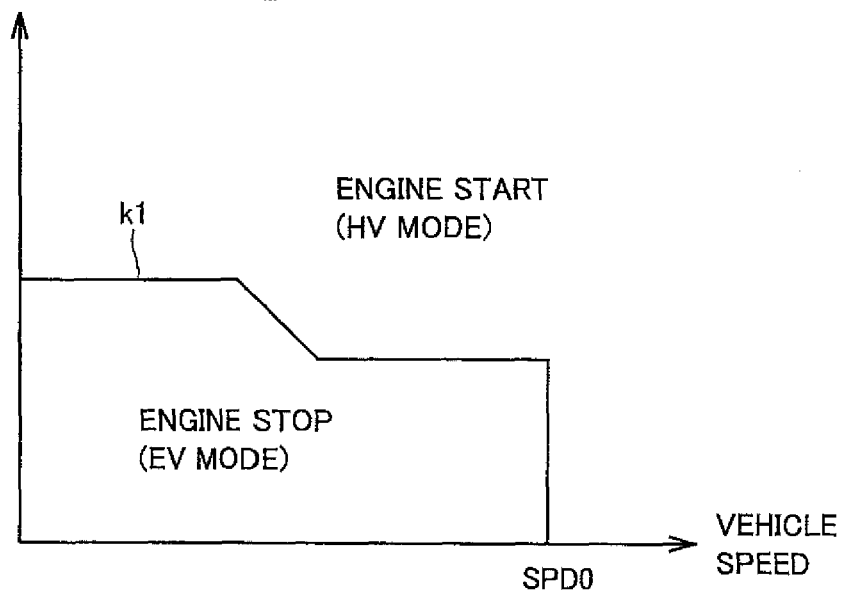
FIG. 5 shows an exemplary threshold value for performing a start determination of an engine.

FIG. 5 shows an exemplary threshold value for performing a start determination of engine 4. Referring to FIG. 5, the vertical axis shows the demanded engine-output value, and the horizontal axis shows the vehicle speed. When the demanded engine-output value is not greater than threshold value k1, it is determined to perform traveling with engine 4 stopped (EV mode). When the demanded engine-output value exceeds threshold value k1, it is determined to perform traveling with engine 4 started (HV mode). Threshold value k1 changes in accordance with the vehicle speed. For example, it becomes greater at low speed (that is, importance is placed on EV mode), and becomes 0 when the vehicle speed exceeds prescribed value SPD0 (that is, always in HV mode).

Referring to FIG. 4 again, when it is determined that the demanded engine-output value is not greater than a threshold value in step S40 (NO in step S40), the process proceeds to step S70, which will be described later. On the other hand, when it is determined that the demanded engine-output value is greater than a threshold value in step S40 (YES in step S40), traveling mode control portion 90 calculates a target rotation speed of engine 4, and actually executes control of engine 4 (step S50). Then, traveling mode control portion 90 calculates a target rotation speed of motor-generator MG1 for maintaining engine 4 at the target rotation speed, and calculates torque command value TR1 for controlling motor-generator MG1 at the target rotation speed (step S60).

Next, traveling mode control portion 90 calculates a torque generated by engine 4 (engine-direct torque) from torque command value TR1 of motor-generator MG1 (step S70). The engine-direct torque can be calculated from torque command value TR1 based on a geometrical configuration (gear ratio) of power split mechanism 3. When the demanded engine-output value is not greater than a threshold value, engine 4 is stopped. Therefore, the engine-direct torque is 0. When the engine-direct torque is calculated, traveling mode control portion 90 subtracts the engine-direct torque from the drive-demanded torque calculated in step S10, thereby calculating torque command value TR2 of motor-generator MG2 (step S80).

Next, traveling mode control portion 90 outputs accelerator pedal opening degree signal ACC to indicator portion 55 (step S90). Also, traveling mode control portion 90 converts the threshold value (corresponding to power) for performing determination of switching traveling mode in step S40 into an accelerator pedal opening degree (step S100). Specifically, traveling mode control portion 90 subtracts a demanded charge amount of power storage apparatus B from the aforementioned threshold value (corresponding to power), and divides the result of operation by an axel rotation speed, thereby calculating drive torque corresponding to the aforementioned threshold value. Then, using the map or operation expression used in step S10, traveling mode control portion 90 calculates back the accelerator pedal opening degree corresponding to the aforementioned threshold value. Then, traveling mode control portion 90 outputs as threshold value TH the threshold value converted into the accelerator pedal opening degree to indicator portion 55 (step S110).

Next, operations of inverters 20, 30 when power storage apparatus B is charged from external power supply 70 are described.

Figure 6:
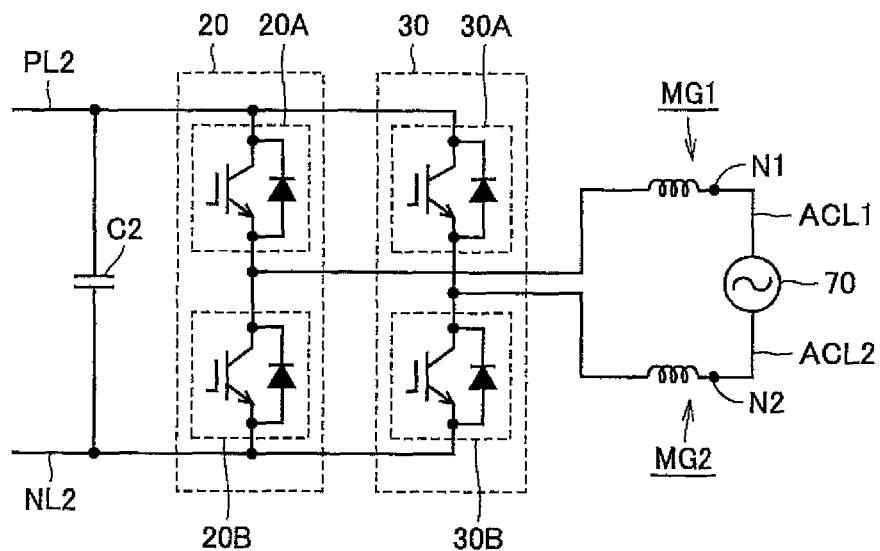
FIG. 6 shows a zero-phase equivalent circuit of inverters and motor-generators shown in FIG. 1.

FIG. 6 shows a zero-phase equivalent circuit of inverters 20, 30 and motor-generators MG1, MG2 shown in FIG. 1. In each of inverters 20, 30 formed by three-phase bridge circuits, there are eight patterns of on/off combinations of six transistors. Two of the eight switching patterns provide zero voltage between the phases. Such a voltage state is referred to as zero voltage vector. The zero voltage vector can be understood that the three transistors of the upper arm are in the same switching state (all on or off), and similarly, the three transistors of the lower arm are in the same switching state. Accordingly, in FIG. 6, the three transistors of the upper arm of inverter 20 are collectively shown as upper arm 20A, and the three transistors of the lower arm of inverter 20 are collectively shown as lower arm 20B. Similarly, the three transistors of the upper arm of inverter 30 are collectively shown as upper arm 30A, and the three transistors of the lower arm of inverter 30 are collectively shown as lower arm 30B.

As shown in FIG. 6, the zero-phase equivalent circuit can be regarded as a single-phase PWM converter which accepts input of single-phase AC power provided to neutral points N1, N2 via power input lines ACL1, ACL2. Accordingly, by changing the zero voltage vector in each of inverters 20, 30 and switch-controlling inverters 20, 30 so that they operate as phase arms of the single-phase PWM converter, the AC power input from power input lines ACL1, ACL2 can be converted into DC power and output to positive electrode line PL2.

As described above, hybrid vehicle 100 in the first embodiment is capable of charging power storage apparatus B from external power supply 70, aiming to broaden the EV mode traveling range. The users of such a hybrid vehicle having an external charging function may be environmentally and economically conscious, and wish to drive in EV mode as much as possible. Now, in the first embodiment, the above-descried indicator portion 55 is provided. That is, the accelerator pedal opening degree by the driver's operation is indicated on first indicator portion 110 of indicator portion 55, and the accelerator pedal opening degree where traveling mode is switched is indicated on second indicator portion 112. Thus, the driver of hybrid vehicle 100 can recognize the accelerator pedal opening degree where traveling mode is switched from EV mode to HV mode.

Therefore, according to the first embodiment, the driver is allowed to drive in EV mode while recognizing the switching point from EV mode to HV mode. That is, the advantage of hybrid vehicle 100 having the externally charging function aiming to broaden the EV mode traveling range is fully exerted. Additionally, the driver can be saved from feeling discomfort about abrupt starting of engine 4.

First Variation

Figure 7:
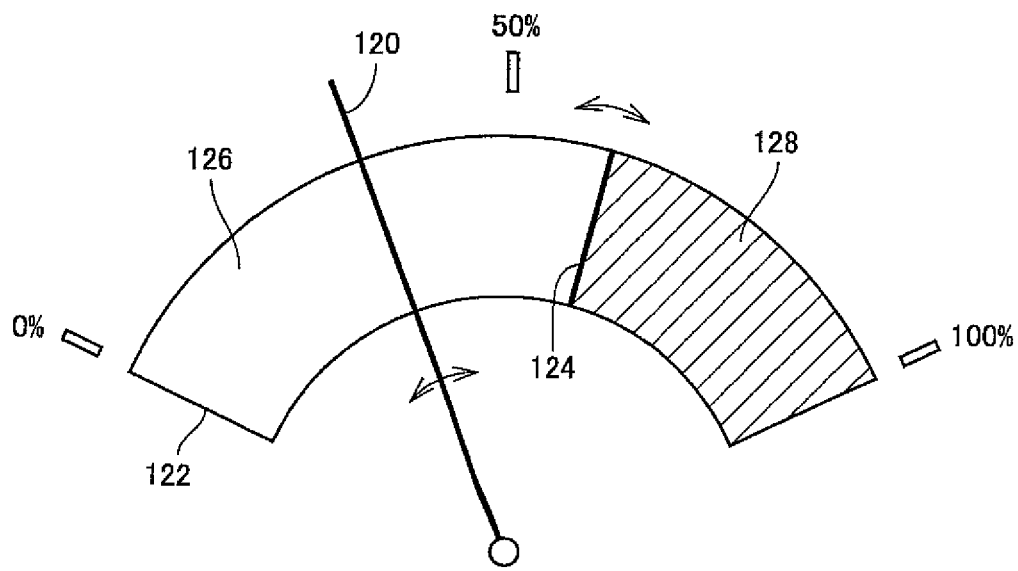
FIG. 7 shows another indicating state of the indicator portion shown in FIG. 1.

FIG. 7 shows another indicating state of the indicator portion shown in FIG. 1. Referring to FIG. 7, an indicator portion 55A includes a first indicator portion 120 and a second indicator portion 122. First indicator portion 120 indicates an accelerator pedal opening degree by the driver's operation, based on accelerator pedal opening degree signal ACC from ECU 50. As the accelerator pedal opening degree is greater, first indicator portion 120 greatly inclines rightward.

Second indicator portion 122 is provided corresponding to first indicator portion 120, and includes a division line 124 and regions 126, 128 divided by division line 124. Division line 124 is indicated based on threshold value TH from ECU 50, and shows an accelerator pedal opening degree where traveling mode is switched. Region 126 shows a range of accelerator pedal opening degrees where the vehicle travels in EV mode, while hatched region 128 shows a range of accelerator pedal opening degrees where the vehicle travels in HV mode. When threshold value TH changes in accordance with the vehicle speed, the position of division line 124 also changes.

Second Variation

Figure 8:
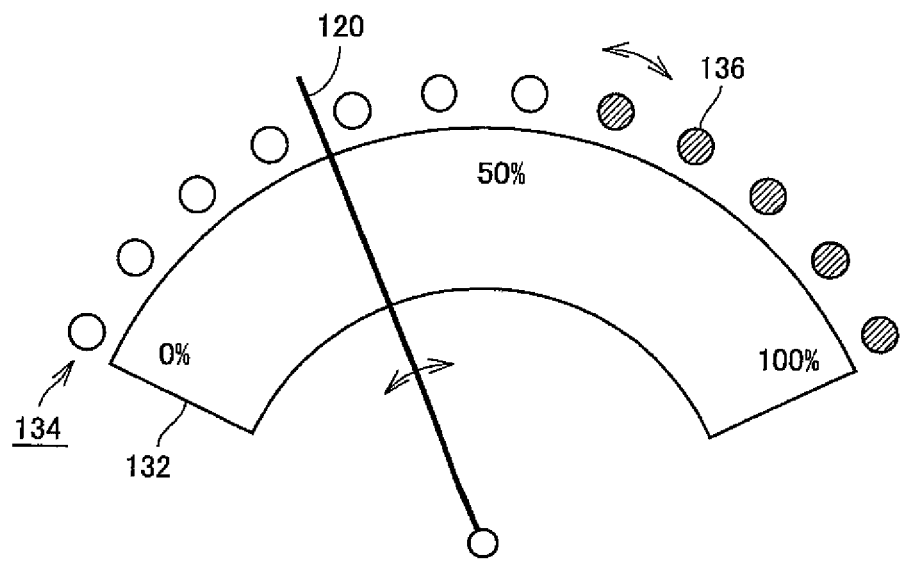
FIG. 8 shows still another indicating state of the indicator portion shown in FIG. 1.

FIG. 8 shows still another indicating state of the indicator portion shown in FIG. 1. Referring to FIG. 8, in the second variation, a second indicator portion 134 is provided at the outer circumference of a sector-shaped indicator portion 132, to indicate whether the vehicle travels in EV mode or HV mode. A range of accelerator pedal opening degrees corresponding to hatched portion 136 is the HV mode traveling range, and the range of hatched portion 136 changes in accordance with threshold value TH from ECU 50.

Third Variation

Figure 9:
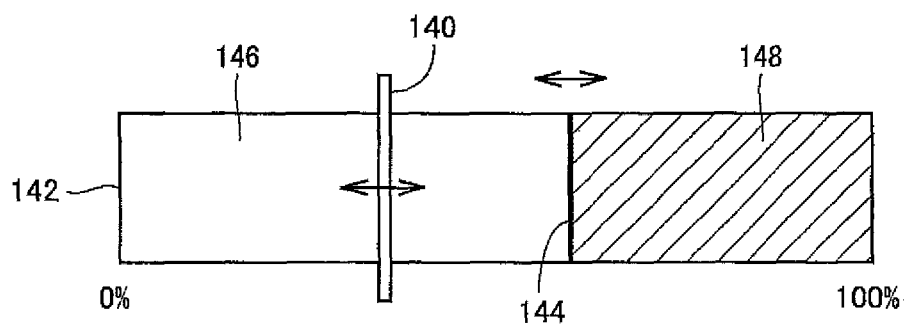
FIG. 9 shows still another indicating state of the indicator portion shown in FIG. 1.

FIG. 9 shows still another indicating state of the indicator portion shown in FIG. 1. Referring to FIG. 9, an indicator portion 55C includes a first indicator portion 140 and a second indicator portion 142. First indicator portion 140 indicates an accelerator pedal opening degree by the driver's operation, based on accelerator pedal opening degree signal ACC from ECU 50. As the accelerator pedal opening degree is greater, first indicator portion 140 moves rightward.

Second indicator portion 142 is provided corresponding to first indicator portion 140, and includes a division line 144 and regions 146, 148 divided by division line 144. Division line 144 is indicated based on threshold value TH from ECU 50, and shows an accelerator pedal opening degree where traveling mode is switched. Region 146 shows a range of accelerator pedal opening degrees where the vehicle travels in EV mode, while hatched region 148 shows a range of accelerator pedal opening degrees where the vehicle travels in HV mode.

Fourth Variation

Figure 10:
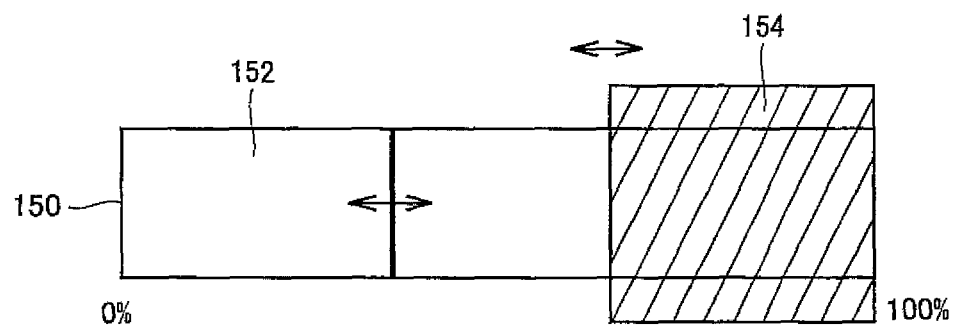
FIG. 10 shows still another indicating state of the indicator portion shown in FIG. 1.

FIG. 10 shows still another indicating state of the indicator portion shown in FIG. 1. Referring to FIG. 10, an indicator portion 55D includes a first indicator portion 150 and a second indicator portion 154. First indicator portion 150 indicates an accelerator pedal opening degree by the driver's operation, based on accelerator pedal opening degree signal ACC from ECU 50. As the accelerator pedal opening degree is greater, region 152 becomes greater.

Second indicator portion 154 shows a range of accelerator pedal opening degrees where the vehicle travels in HV mode. That is, when region 152 of first indicator portion 150 overlaps with second indicator portion 154, engine 4 is started and the traveling mode is switched to HV mode.

Fifth Variation

Figure 11:
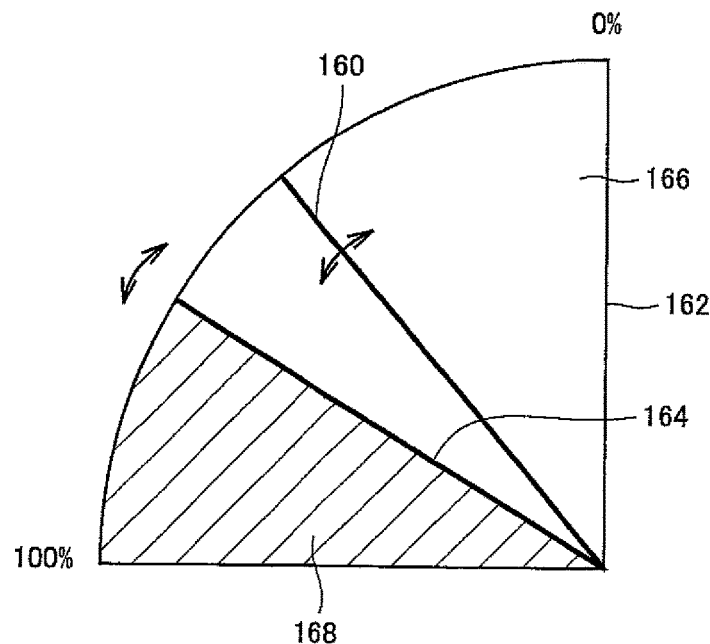
FIG. 11 shows still another indicating state of the indicator portion shown in FIG. 1.

FIG. 11 shows still another indicating state of the indicator portion shown in FIG. 1. Referring to FIG. 11, an indicator portion 55E indicates in a manner modeling the actual accelerator pedal operation. Indicator portion 55E includes a first indicator portion 160 and a second indicator portion 162. First indicator portion 160 indicates an accelerator pedal opening degree by the driver's operation, based on accelerator pedal opening degree signal ACC from ECU 50. As the accelerator pedal opening degree is greater, tilt amount of first indicator portion 160 becomes smaller.

Second indicator portion 162 includes a division line 164 and regions 166, 168 divided by division line 164. Division line 164 is indicated based on threshold value TH from ECU 50, and shows an accelerator pedal opening degree where traveling mode is switched. Region 166 shows a range of accelerator pedal opening degrees where the vehicle travels in EV mode, while hatched region 168 shows a range of accelerator pedal opening degrees where the vehicle travels in HV mode.

Sixth Variation

Figure 12:
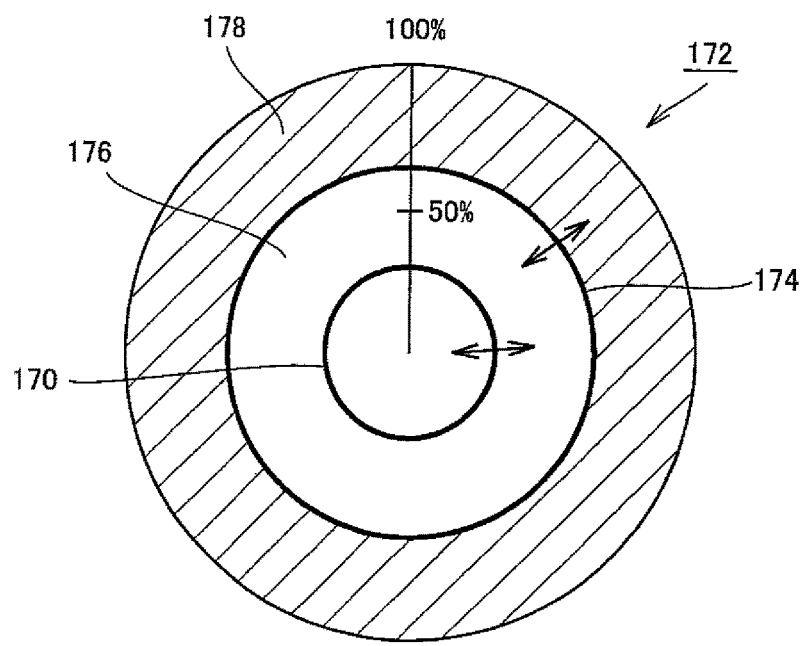
FIG. 12 shows still another indicating state of the indicator portion shown in FIG. 1.

FIG. 12 shows still another indicating state of the indicator portion shown in FIG. 1. Referring to FIG. 12, in indicator portion 55E, an accelerator pedal opening degree is indicated by the size of a circle. Indicator portion 55E includes a first indicator portion 170 and a second indicator portion 172. First indicator portion 170 indicates an accelerator pedal opening degree by the driver's operation, based on accelerator pedal opening degree signal ACC from ECU 50. As the accelerator pedal opening degree is greater, the circle becomes large.

Second indicator portion 172 includes a division line 174 and regions 176, 178 divided by division line 174. Division line 174 is indicated based on threshold value TH from ECU 50, and shows an accelerator pedal opening degree where traveling mode is switched. Region 176 shows a range of accelerator pedal opening degrees where the vehicle travels in EV mode, while hatched region 178 shows a range of accelerator pedal opening degrees where the vehicle travels in HV mode.

Seventh Variation

Figure 13:
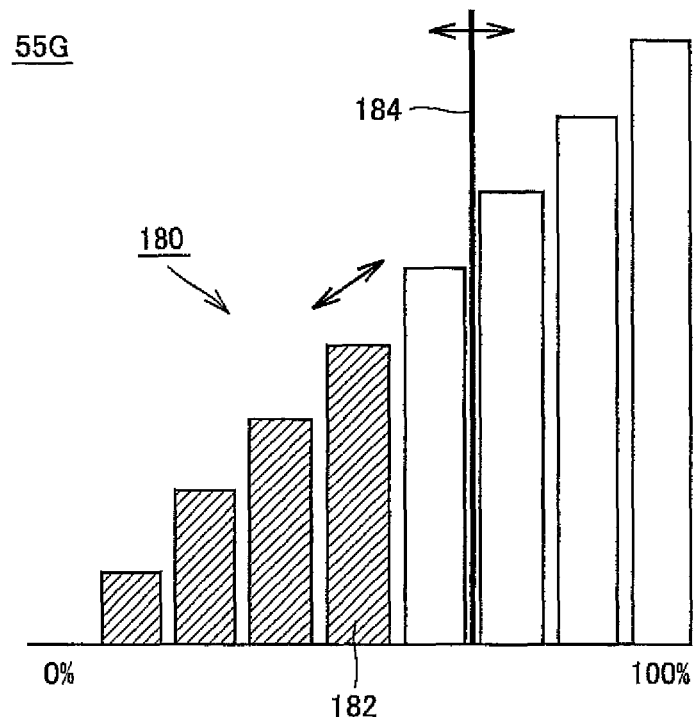
FIG. 13 shows still another indicating state of the indicator portion shown in FIG. 1.

FIG. 13 shows still another indicating state of the indicator portion shown in FIG. 1. Referring to FIG. 13, an indicator portion 55G includes a first indicator portion 180 and a second indicator portion 184. First indicator portion 180 is formed by a stepwise bar graph that increases rightward. A hatched region 182 becomes greater as an accelerator pedal opening degree indicated based on accelerator pedal opening degree signal ACC from ECU 50 is greater.

Second indicator portion 184 is indicated based on threshold value TH from ECU 50, and shows an accelerator pedal opening degree where traveling mode is switched. That is, when region 182 of first indicator portion 180 does not exceed a threshold line of second indicator portion 184, the vehicle travels in EV mode. When region 182 exceeds the threshold line, the traveling mode is switched to HV mode. When threshold value TH changes, the indicating position of second indicator portion 184 changes accordingly.

Eighth Variation

Figure 14:
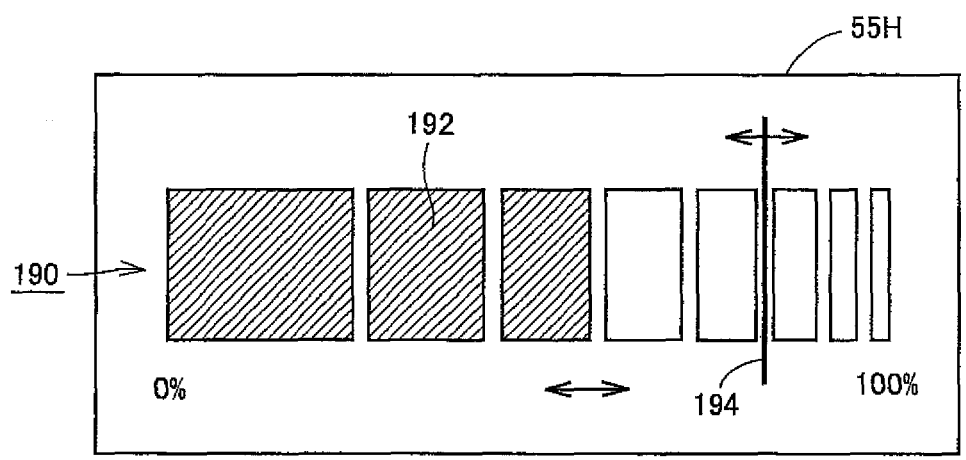
FIG. 14 shows still another indicating state of the indicator portion shown in FIG. 1.

FIG. 14 shows still another indicating state of the indicator portion shown in FIG. 1. Referring to FIG. 14, in an indicator portion 55H, a region where an accelerator pedal opening degree is small is indicated with emphasis. Indicator portion 55H includes a first indicator portion 190 and a second indicator portion 194. First indicator portion 190 shows an accelerator pedal opening degree by the driver's operation based on accelerator pedal opening degree signal ACC from ECU 50, wherein hatched region 192 shows an actual accelerator pedal opening degree. Second indicator portion 194 is indicated based on threshold value TH from ECU 50, and shows an accelerator pedal opening degree where traveling mode is switched. Here, in order to let the driver to be conscious to operate the accelerator pedal at small opening degrees, in first indicator portion 190, the indication region is greater as an accelerator pedal opening degree is smaller.

Second Embodiment

In a second embodiment, when each output of power storage apparatus B, boost converter 10, inverters 20, 30 (in the following, boost converter 10 and inverters 20, 30 are also collectively referred to as "a power control unit (PCU)"), and motor-generators MG1, MG2 is limited due to an increase in the apparatus temperature or any other factor, a threshold value for switching traveling mode is corrected so that the HV mode traveling range is increased. In accordance with the correction of the threshold value for switching, a traveling mode switching point indicated on the indicator portion is also changed. That is, in the second embodiment, when the output is restricted, the traveling mode switching point that is indicated on the indicator portion is also changed accordingly.

The overall configuration of the powertrain of the hybrid vehicle in the second embodiment is the same as hybrid vehicle 100 in the first embodiment shown in FIG. 1.

Figure 15:
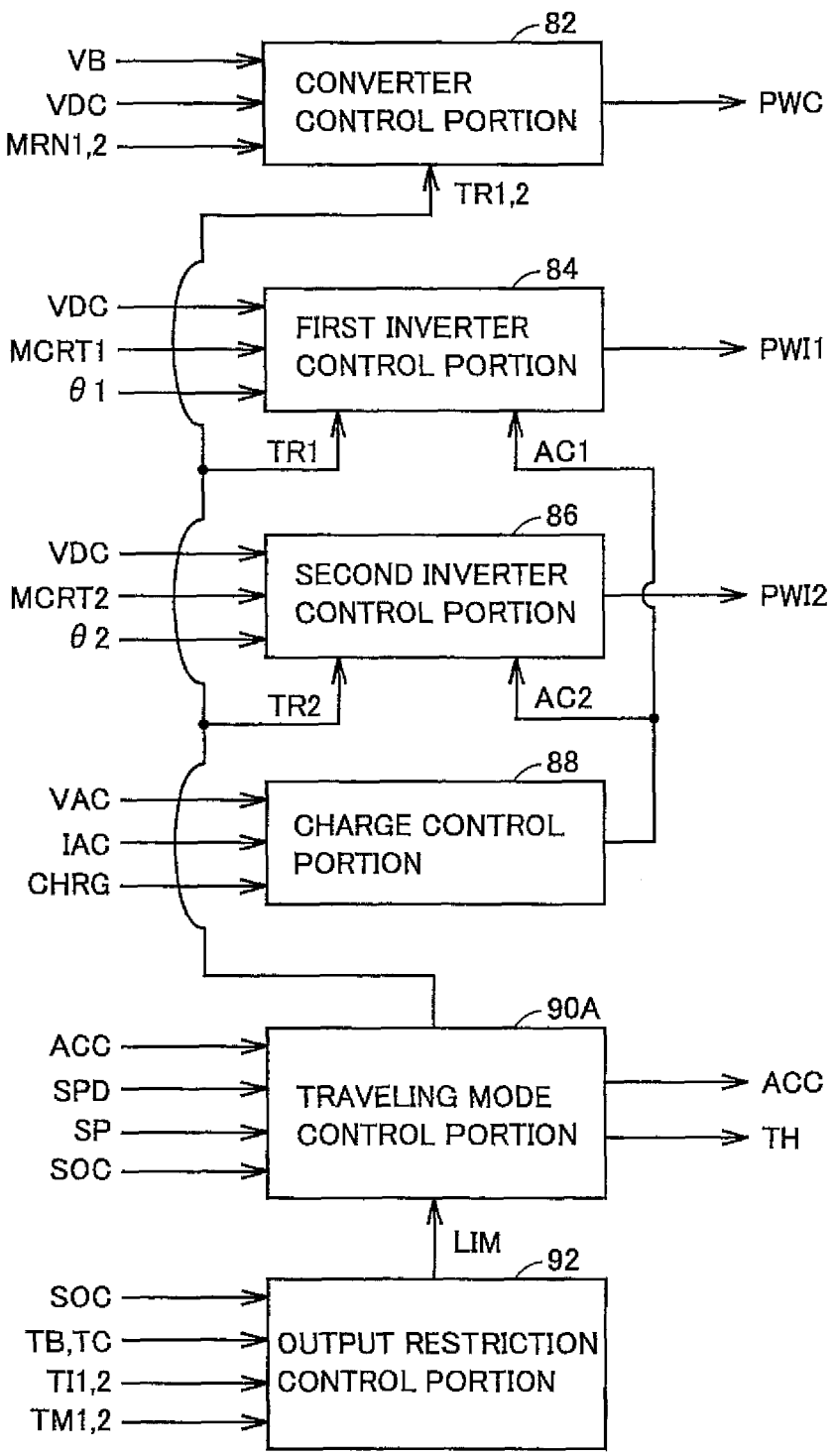
FIG. 15 is a functional block diagram of an ECU in a second embodiment.

FIG. 15 is a functional block diagram of an ECU in the second embodiment. Referring to FIG. 15, as compared with the configuration of ECU 50 in the first embodiment shown in FIG. 3, an ECU 50A in the second embodiment additionally includes an output restriction control portion 92, and includes a traveling mode control portion 90A in place of traveling mode control portion 90.

Output restriction control portion 92 receives SOC and temperature TB of power storage apparatus B, temperature TC of boost converter 10, temperatures TI1, TI2 of inverters 20, 30, and temperatures TM1, TM2 of motor-generators MG1, MG2. Then, as will be described later, output restriction control portion 92 executes output restriction control of restricting the output of power storage apparatus B, the PCU or motor-generators MG1, MG2, based on each of the detection values. Then, during execution of output restriction control, output restriction control portion 92 activates a signal LIM being output to traveling mode control portion 90A. Each temperature detection value is detected by a not-shown temperature sensor.

When signal LIM from output restriction control portion 92 is activated, traveling mode control portion 90A corrects a threshold value for switching traveling mode. Specifically, when signal LIM is activated, traveling mode control portion 90A corrects the threshold value so that engine 4 is started at an earlier stage, i.e., so that the HV mode traveling range becomes greater. Traveling mode control portion 90A calculates threshold value TH of accelerator pedal opening degree corresponding to the corrected threshold value, and outputs the calculated threshold value TH along with accelerator pedal opening degree signal ACC to indicator portion 55 (FIG. 1).

FIG. 16 is an illustration for describing output restriction control by output restriction control portion 92 shown in FIG. 15. Referring to FIG. 16, when SOC of power storage apparatus B is not greater than a prescribed value, or when temperature TB of power storage apparatus B is not higher than a lower limit value or not lower than an upper limit value, output restriction control portion 92 restricts the output power of power storage apparatus B. When the temperatures of inverters 20, 30 become not lower than an upper limit value during loaded traveling (when motor-generator MG2 is driven for acceleration), or when temperature of boost converter 10 becomes not lower than an upper limit value during loaded traveling, output restriction control portion 92 restricts the output of the PCU. When the temperature of motor-generator MG1 or MG2 becomes not lower than an upper limit value during loaded traveling, output restriction control portion 92 restricts an output of the corresponding motor-generator.

Figure 17:
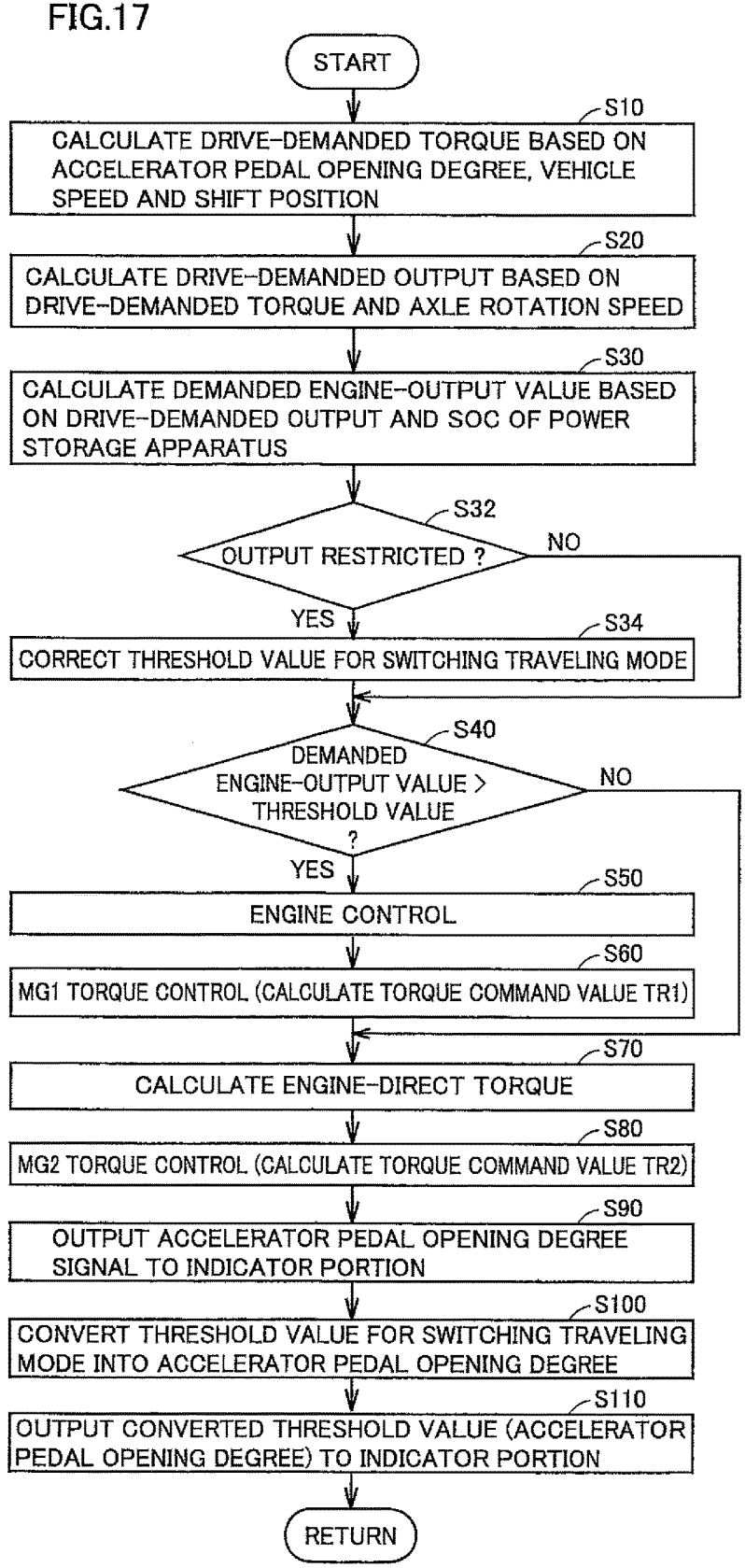
FIG. 17 is a flowchart for describing a control structure of a traveling mode control portion shown in FIG. 15.

FIG. 17 is a flowchart for describing a control structure of traveling mode control portion 90A shown in FIG. 15. The processing of the flowchart is also called from a main routine for a certain time period or every time a prescribed condition is satisfied when the vehicle is in a state capable of traveling (for example, when the vehicle system is active), and executed.

Referring to FIG. 17, the flowchart is different from the flowchart of FIG. 4 in that it further includes steps S32, S34. That is, when a demanded engine-output value is calculated in step S30, traveling mode control portion 90A determines whether or not output restriction control is executed, based on signal LIM from output restriction control portion 92 (step S32).

When traveling mode control portion 90A determines that the output restriction control is executed by output restriction control portion 92 (YES in step S32), it corrects a threshold value for making determination of switching traveling mode (step S34).

Figure 18:
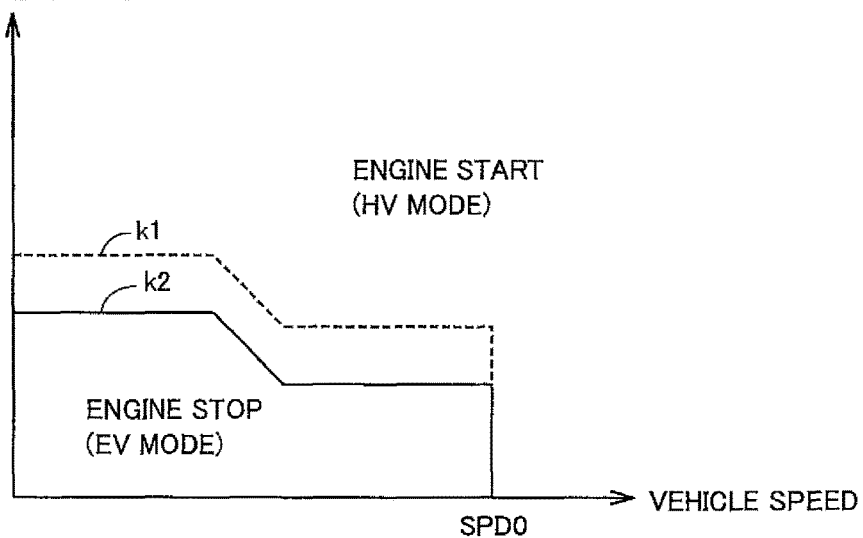
FIG. 18 shows a threshold value for switching traveling mode under output restriction control.

FIG. 18 shows a threshold value for switching traveling mode under output restriction control. Referring to FIG. 18, the vertical axis shows the demanded engine-output value, and the horizontal axis shows the vehicle speed. The threshold value k1 represented by a dashed line shows a threshold value for switching when the output restriction control is not executed, while threshold value k2 represented by a solid line shows a threshold value when the output restriction control is executed by output restriction control portion 92. When output restriction control is executed, the output from motor-generator MG2 is decreased. Therefore, the threshold value for switching traveling mode is corrected so that the range where engine 4 operates, i.e., the HV mode traveling range, becomes greater.

Referring to FIG. 17 again, when the threshold value for making determination of switching traveling mode is corrected in step S34, the processing proceeds to step S40, where whether or not the demanded engine-output value calculated in step S30 is greater than the corrected threshold value is determined.

Then, in step S100, the threshold value corrected in step S34 (corresponding to power) is converted into an accelerator pedal opening degree. In step S110, the threshold value converted into the accelerator pedal opening degree is output as threshold value TB to indicator portion 55. That is, the threshold value for switching traveling mode is corrected under the output restriction control, and the corrected threshold value is also output to indicator portion 55 that indicates to the driver a traveling mode switching point. Based on the corrected threshold value, the accelerator pedal opening degree where traveling mode is switched is indicated on indicator portion 55.

When it is determined in step S32 that the output restriction control is not executed (NO in step S32), the processing proceeds to step S40 without executing step S34.

As described above, in the second embodiment, when the output of power storage apparatus B, the PCU, or motor-generators MG1, MG2 is restricted, a threshold value for switching traveling mode is corrected, and a traveling mode switching point indicated on the indicator portion 55 is also changed accordingly. Therefore, according to the second embodiment, the timing where traveling mode is switched can accurately be indicated.

Third Embodiment

Irrespective of the driver's accelerator pedal operation, engine 4 may be started based on a demand from the system side. In a third embodiment, when engine 4 is started based on a demand from the system side, that is, when traveling mode is switched from EV mode to HV mode based on a demand from the system side, the indicating state of indicator portion 55 is also appropriately changed accordingly.

The overall configuration of the powertrain of the hybrid vehicle in the third embodiment is the same as hybrid vehicle 100 in the first embodiment shown in FIG. 1.

Figure 19:
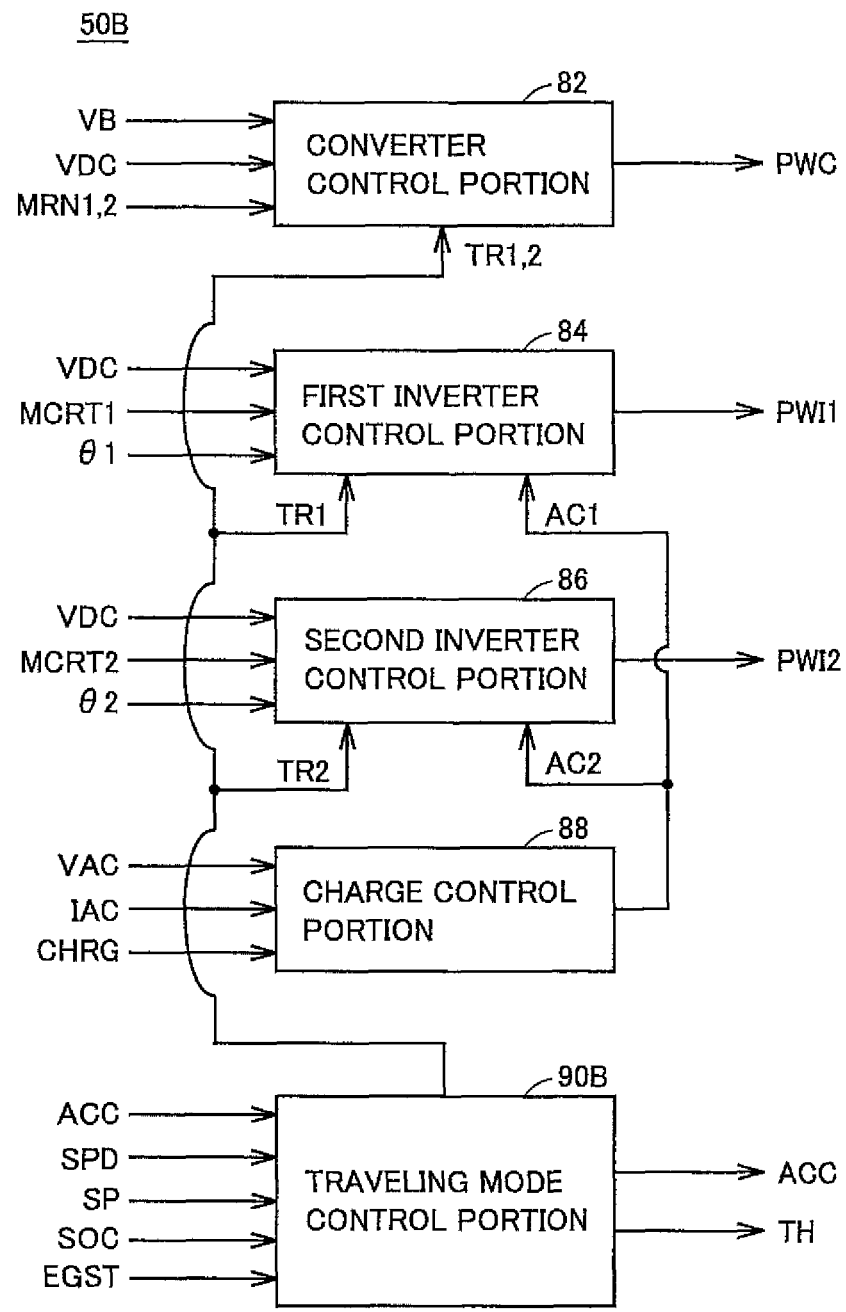
FIG. 19 is a functional block diagram of an ECU in a third embodiment.

FIG. 19 is a functional block diagram of an ECU in the third embodiment. Referring to FIG. 19, an ECU 50B in the third embodiment includes, as compared with the configuration of ECU 50 in the first embodiment shown in FIG. 3, a traveling mode control portion 90B in place of traveling mode control portion 90.

Traveling mode control portion 90B receives a signal EGST from a not-shown vehicle ECU. Signal EGST is a signal that instructs starting of engine 4 based on a demand from the system side. The case where engine 4 is started based on a demand from the system side may include a case where warm-up driving of engine 4 is necessary after cold-start, a case where the catalyst of engine 4 needs to be warmed up, a case where the heater performance of an air conditioner cannot be maintained, a case where SOC of power storage apparatus B is reduced, a case where the temperature of power storage apparatus B is not higher than a prescribed temperature (for example 0° C.), and the like. When one of these conditions is satisfied, signal EGST is activated by the vehicle ECU.

When signal EGST is activated, traveling mode control portion 90B starts engine 4 if engine 4 is stopped. That is, when signal EGST is activated, traveling mode control portion 90B switches traveling mode from EV mode to HV mode. Furthermore, traveling mode control portion 90B sets threshold value TH output to indicator portion 55 to 0% (full close).

Figure 20:
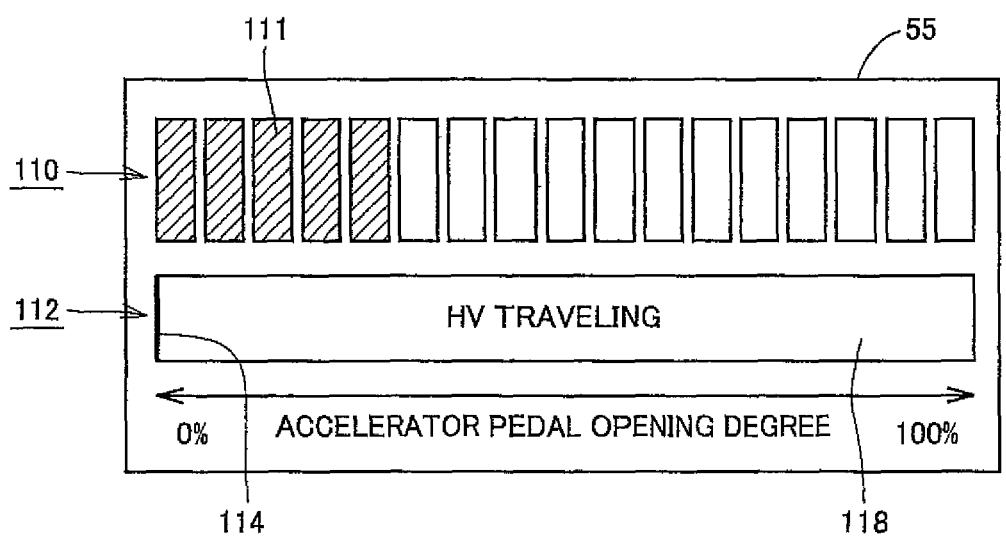
FIG. 20 shows an indicating state of an indicator portion when the engine is started based on a demand from the system side.

FIG. 20 shows an indicating state of indicator portion 55 when engine 4 is started based on a demand from the system side. Referring to FIG. 20, when engine 4 is started based on a demand from the system side, indicator portion 55 moves division line 114 in second indicator portion 112 to the leftmost end, based on threshold value TH (0%) from ECU 50. Then, second indicator portion 112 is fully occupied by region 116, indicating that the vehicle travels in HV mode (HV traveling) irrespective of the driver's accelerator pedal operation.

It is to be noted that, when engine 4 is started based on a demand from the system side, in addition to moving division line 114 in second indicator portion 112 to the leftmost end, a lamp or the like for indicating that engine 4 is started based on a demand from the system side may be provided.

As described above, in the third embodiment, when engine 4 is started based on a demand from the system side, it is indicated on indicator portion 55 that HV mode is set over the entire range of accelerator pedal opening degrees. Therefore, according to the third embodiment, it can appropriately be indicated to the driver that traveling mode is switched from EV mode to HV mode based on a demand from the system side.

Fourth Embodiment

In a fourth embodiment, an EV mode switch that allows the driver to select to travel in EV mode while restricting starting of engine 4 is provided. Then, when EV mode is selected by the EV mode switch, the indicating state of indicator portion 55 is also appropriately changed accordingly.

Figure 21:
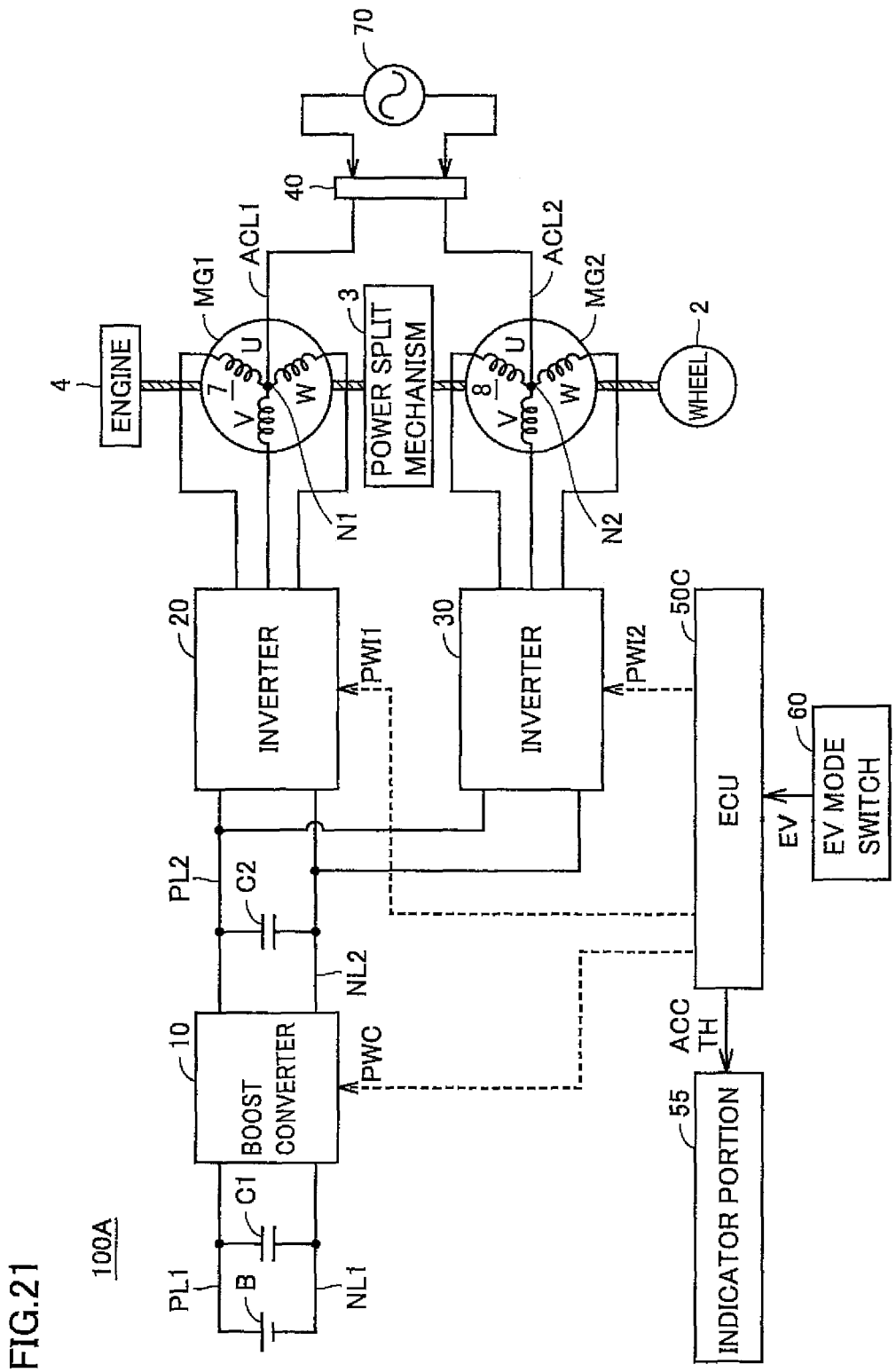
FIG. 21 is an overall block diagram showing a hybrid vehicle according to a fourth embodiment.

FIG. 21 is an overall block diagram of a hybrid vehicle according to the fourth embodiment. Referring to FIG. 21, as compared with the configuration of hybrid vehicle 100 in the first embodiment shown in FIG. 1, a hybrid vehicle 100A additionally includes an EV mode switch 60, and includes an ECU 50C in place of ECU 50.

EV mode switch 60 is an operation switch for allowing the driver to select to travel in EV mode while restricting starting of engine 4. Then, when EV mode switch 60 is operated by the driver, EV mode switch 60 activates EV mode signal EV being output to ECU 50C.

When EV mode signal EV from EV mode switch 60 is activated, if traveling mode is HV mode, ECU 50C stops engine 4 and switches traveling mode to EV mode. Then, ECU 50C sets threshold value TH being output to indicator portion 55 to a prescribed value (for example, an accelerator pedal opening degree of 95%). It is to be noted that the prescribed value corresponds to an accelerator pedal opening degree for canceling traveling in EV mode that is forced by EV mode switch 60.

Figure 22:
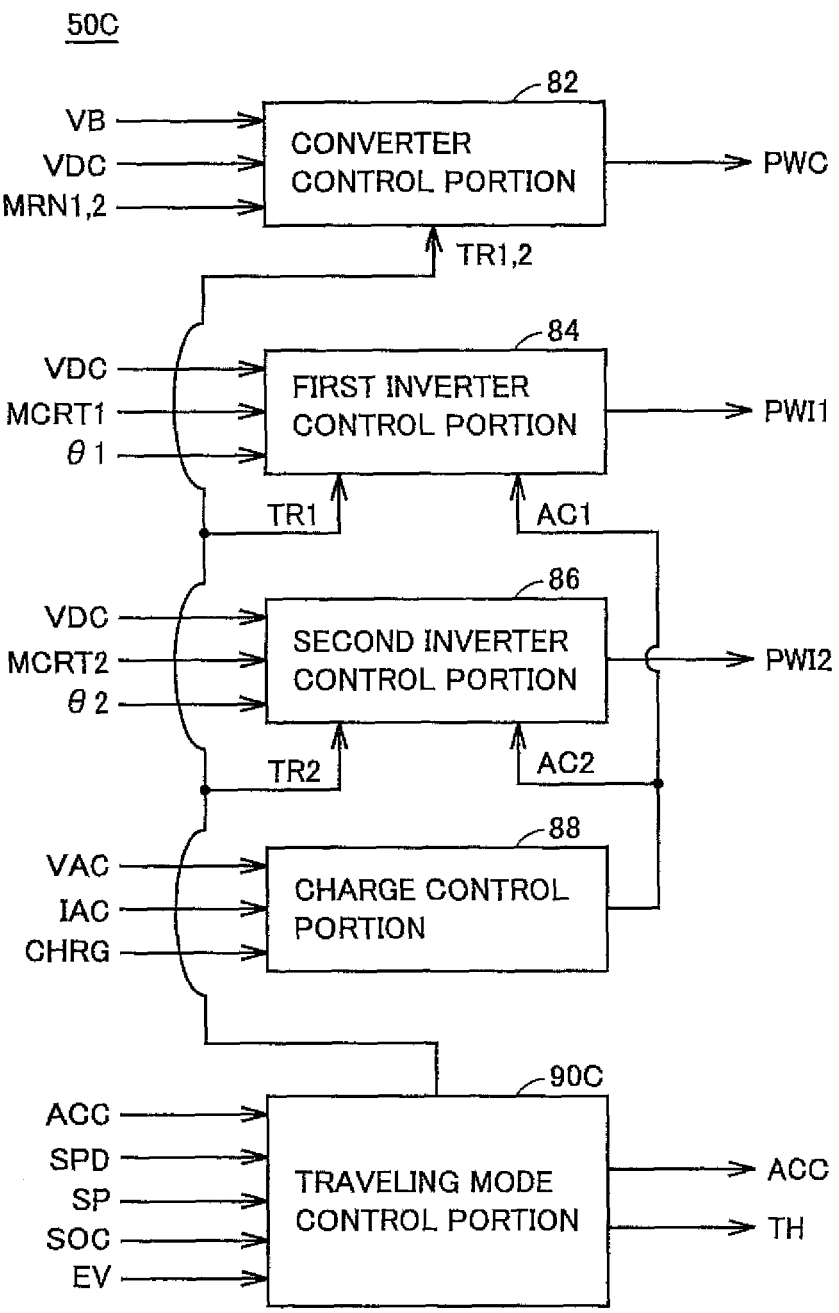
FIG. 22 is a functional block diagram of an ECU shown in FIG. 21.

FIG. 22 is a functional block diagram of ECU 50C shown in FIG. 21. Referring to FIG. 22, as compared with a configuration of ECU 50 in the first embodiment shown in FIG. 3, ECU 50C includes a traveling mode control portion 90C in place of traveling mode control portion 90.

Traveling mode control portion 90C receives EV mode signal EV from EV mode switch 60. Then, when EV mode signal EV is activated, traveling mode control portion 90C stops engine 4 if engine 4 is operating. That is, when EV mode signal EV is activated, traveling mode control portion 90C switches traveling mode from HV mode to EV mode. Also, traveling mode control portion 90C sets threshold value TH being output to indicator portion 55 to the prescribed value.

It is to be noted that, traveling mode control portion 90C switches traveling mode from EV mode to HV mode and returns threshold value TH being output to indicator portion 55 to a normal value when: the accelerator pedal opening degree becomes not smaller than the prescribed value when EV mode signal EV is activated; the SOC of power storage apparatus B becomes not greater than a prescribed value; or the vehicle speed becomes not smaller than a prescribed value.

Figure 23:
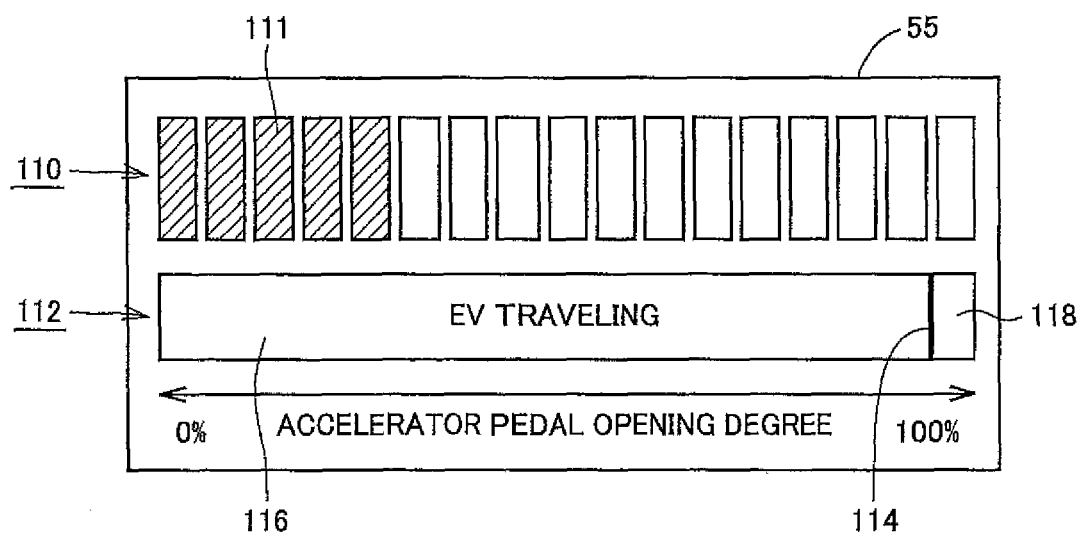
FIG. 23 shows an indicating state of an indicator portion when an EV mode switch is operated.

FIG. 23 shows an indicating state of indicator portion 55 when EV mode switch 60 is operated. Referring to FIG. 23, when EV mode switch 60 is operated by the driver, indicator portion 55 moves division line 114 in second indicator portion 112 rightward, based on threshold value TH from ECU 50 (for example, an accelerator pedal opening degree of 95%). As a result, unless the accelerator pedal opening degree by the driver's operation is full open (not smaller than 95%), it is indicated that the vehicle travels in EV mode (EV traveling).

As described above, in the fourth embodiment, when EV mode switch 60 is operated by the driver, indication of indicator portion 55 is changed accordingly. Therefore, according to the fourth embodiment, even when EV mode is selected by EV mode switch 60, a traveling mode switching point can be indicated to the driver appropriately.

In the foregoing embodiments, for better viewability, it is desirable that an indication update cycle of the second indicator portion (the traveling mode indication region) in indicator portion 55 (55A-55H) is longer than that of the first indicator portion (the accelerator pedal opening degree indication region).

In the embodiments described above, while it has been described that indicator portion 55 (55A-55H) indicates an accelerator pedal opening degree, a state amount reflecting an output demand from the driver such as vehicular drive-demanded torque or drive-demanded output may be indicated, instead of the accelerator pedal opening degree.

In the second to fourth embodiments described above, the configuration of the indicator portion is not limited to indicator portion 55 shown in FIG. 2 and, for example, the indicator portion may be indicator portions 55A-55H in the first to eighth variations of the first embodiment.

In the embodiments described above, while it has been described that the threshold value for switching from EV mode to HV mode and that for switching from HV mode to EV mode are the same, they may be different and hysteresis may be provided in switching traveling mode.

In the foregoing, while it has been described that the hybrid vehicle is series/parallel type capable of splitting and transmitting motive power of engine 4 by power split mechanism 3 for the axle and motor-generator MG1, the present invention is also applicable to a series type hybrid vehicle that uses engine 4 only for driving motor-generator MG1 and generates drive force for the vehicle only by motor-generator MG2 that uses power generated by motor-generator MG1.

In the foregoing, while it has been described that the hybrid vehicle is capable of charging power storage apparatus B from external power supply 70, the applicable range of the present invention is not limited to a hybrid vehicle capable of charging a power storage apparatus from an external power supply. On the other hand, with such a hybrid vehicle capable of charging a power storage apparatus from an external power supply, the traveling range in EV mode is increased. Therefore, the present invention capable of indicating to the driver a switching point from EV mode to HV mode is particularly useful for the hybrid vehicle capable of charging a power storage apparatus from an external power supply.

In the foregoing, while it has been described that AC power from external power supply 70 is provided to neutral points N1, N2 of motor-generators MG1, MG2, and power storage apparatus B is charged using motor-generators MG1, MG2 and inverters 20, 30, an inverter dedicated to charge power storage apparatus B from external power supply 70 may separately be provided. However, according to the embodiments described above, since it is not necessary to separately provide an inverter dedicated to charging, reduction in costs and weight of the vehicle can be achieved.

In the foregoing, ECU 50, 50A-50C correspond to "a control portion" of the present invention. Engine 4 corresponds to "an internal combustion engine" of the present invention. Motor-generator MG2 corresponds to "an electric motor" of the present invention. Motor-generator MG1 corresponds to "a further electric motor" of the present invention. Inverters 20, 30 respectively correspond to "a first inverter" and "a second inverter" of the present invention.

Furthermore, ECU 50, 50A-50C correspond to "an inverter control portion" of the present invention. Power input lines ACL1, ACL2 and charge connector 40 form "a power input portion" of the present invention. Furthermore, three-phase coils 7, 8 respectively correspond to "a first polyphase winding" and "a second polyphase winding" of the present invention.

It should be understood that the embodiments disclosed herein are illustrative and non-restrictive in every respect. The scope of the present invention is defined by the terms of the claims, rather than the embodiments above, and is intended to include any changes within the meaning and scope equivalent to the terms of the claims.

The invention claimed is:

1. An indicator apparatus for a hybrid vehicle that has an internal combustion engine and an electric motor as motive power sources, and that is capable of traveling in a first traveling mode in which traveling is performed while the internal combustion engine is stopped, and a second traveling mode in which traveling is performed while both the internal combustion engine and the electric motor are operated, the indicator apparatus comprising:
an electronic control unit configured to switch between the first traveling mode and the second traveling mode based on an output demand from a driver of the vehicle;
a display region having a range that extends between first and second ends of the display region, the display region displaying a first mark to indicate to the driver a first state amount that changes in accordance with the output demand from the driver, a first edge of the first mark moving across the range between the first and second ends of the display region as the first state amount changes, the first edge of the mark having a first length whereby a first area of the display region over which the first mark moves between the first and second ends of the display region has a width equal to or less than the first length; and
a second mark having a second edge that is displayed so that the second edge extends across the first area of the display region in a direction of the width of the first area and the second edge is superimposed with the first area of the display region, the second edge indicating to the driver a threshold at which switching occurs between the first traveling mode and the second traveling mode so that the driver can recognize the switching and whether traveling is being performed in the first traveling mode or the second traveling mode by comparing positions of the first and second edges between the first and second ends of the display region, the first edge becoming superimposed with the second edge when the output demand from the driver reaches the threshold, wherein the first edge is displayed between the first end of the display region and the second edge when the vehicle is traveling in the first traveling mode, and the first edge is displayed between the second end of the display region and the second edge when the vehicle is traveling in the second traveling mode.

2. The indicator apparatus according to claim 1, wherein the first edge and the second edge have different lengths.

3. The indicator apparatus according to claim 2, wherein the second edge is longer than the first edge.

4. The indicator apparatus according to claim 1, wherein the first state amount and the threshold are accelerator pedal opening degrees.

5. The indicator apparatus according to claim 1, wherein the electronic control unit is configured to change a value of the threshold for switching between the first traveling mode and the second traveling mode, and
the position of the second edge of the second mark changes in accordance with the change of the value of the threshold.

6. The indicator apparatus according to claim 5, wherein the electronic control unit is configured to change the value of the threshold for switching between the first traveling mode and the second traveling mode in accordance with a speed of the vehicle.

7. The indicator apparatus according to claim 5, wherein when an output power of a power storage apparatus that supplies electric power to the electric motor is restricted, the electronic control unit changes the value of the threshold for switching between the first traveling mode and the second traveling to increase a range in which traveling is performed in the second traveling mode.

8. The indicator apparatus according to claim 5, wherein when a temperature of a power converting apparatus converting electric power between a power storage apparatus supplying electric power to the electric motor and the electric motor becomes not lower than a prescribed temperature, the electronic control unit changes the value of the threshold for switching between the first traveling mode and the second traveling mode to increase a range in which traveling is performed in the second traveling mode.

9. The indicator apparatus according to claim 5, wherein when a temperature of the electric motor becomes not lower than a prescribed temperature, the electronic control unit changes the value of the threshold for switching between the first traveling mode and the second traveling mode to increase a range in which traveling is performed in the second traveling mode.

10. The indicator apparatus according to claim 1, wherein when starting of the internal combustion engine is demanded based on a prescribed condition irrespective of the output demand from the driver, the electronic control unit forcibly switches to the second traveling mode, and
when forcibly switched to the second traveling mode, the second mark is not displayed thereby showing that the second traveling mode is selected for an entirety of the range of the display region.

11. The indicator apparatus according to claim 1, wherein the hybrid vehicle includes a switch for allowing the driver to select traveling in the first traveling mode,
when the switch is operated by the driver, the electronic control unit changes a value of the threshold for switching between the first traveling mode and the second traveling mode to increase a range in which traveling is performed in the first traveling mode, and
the position of the second edge of the second mark changes in accordance with the change of the value of the threshold.

12. The indicator apparatus according to claim 1, wherein when starting of the internal combustion engine is demanded based on a prescribed condition irrespective of the output demand from the driver, the electronic control unit forcibly switches to the second traveling mode, the prescribed condition including at least one of (i) a case where warm-up driving of the engine is necessary after cold start, (ii) a case where a catalyst of the engine needs to be warmed up, (iii) a case where heater performance of an air conditioner cannot be maintained, and (iv) a case where a temperature of the power storage apparatus is not higher than a prescribed temperature, and
when forcibly switched to the second traveling mode, the second mark is not displayed thereby showing that the second traveling mode is selected for an entirety of the range of the display region.

13. The indicator apparatus according to claim 1, wherein the first edge of the display region represents zero output demand from the driver, and
the second edge of the display region represents maximum output demand from the driver.

* * * * *